United States Patent
Clatanoff et al.

(10) Patent No.: US 9,589,514 B2
(45) Date of Patent: Mar. 7, 2017

(54) METHODS AND APPARATUS FOR REDUCED BANDWIDTH PULSE WIDTH MODULATION

(71) Applicant: Texas Instruments Incorporated, Dallas, TX (US)

(72) Inventors: Todd Alan Clatanoff, Allen, TX (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 188 days.

(21) Appl. No.: 14/626,045

(22) Filed: Feb. 19, 2015

(65) Prior Publication Data

US 2015/0245038 A1    Aug. 27, 2015

Related U.S. Application Data

(60) Provisional application No. 61/943,097, filed on Feb. 21, 2014.

(51) Int. Cl.
  *G09G 3/36* (2006.01)
  *H04N 9/31* (2006.01)

(52) U.S. Cl.
  CPC ............. *G09G 3/36* (2013.01); *H04N 9/3111* (2013.01); *H04N 9/3179* (2013.01)

(58) Field of Classification Search
  None
  See application file for complete search history.

(56) References Cited

U.S. PATENT DOCUMENTS

| | | | | |
|---|---|---|---|---|
| 5,412,592 | A | * | 5/1995 | Krishnamoorthy ...... G06K 9/74 365/49.17 |
| 6,064,423 | A | * | 5/2000 | Geng ................. G02B 27/2292 345/32 |
| 2005/0093793 | A1 | * | 5/2005 | Richards ............ G02B 26/0841 345/84 |
| 2008/0143747 | A1 | * | 6/2008 | Morgan ............... G09G 3/2022 345/629 |

(Continued)

OTHER PUBLICATIONS

Chen et al ("Lossless Bit-plane Compression of Images with Context Tree Modeling", 2010, IEEE).*

*Primary Examiner* — Kee M Tung
*Assistant Examiner* — Xin Sheng
(74) *Attorney, Agent, or Firm* — Michael A. Davis, Jr.; Charles A. Brill; Frank D. Cimino

(57) ABSTRACT

Methods and apparatus for reduced bandwidth pulse width modulation are disclosed. A system includes a digital controller circuit coupled to a data interface, the digital controller circuit configured to receive image data for display and further configured to encode line data for transmission to a spatial light modulator using a data compression scheme; and the spatial light modulator coupled to the data interface and configured to receive encoded data and to decode the encoded data to produce unencoded data corresponding to pixel data for display on an array of pixel elements in the spatial light modulator; wherein data transmitted from the digital controller circuit to the spatial light modulator further comprises encoded data that is formed from bit planes using a data compression scheme to form partial lines of data. Additional methods and apparatus are disclosed.

27 Claims, 9 Drawing Sheets

(56) References Cited

U.S. PATENT DOCUMENTS

| | | | | |
|---|---|---|---|---|
| 2009/0103053 A1* | 4/2009 | Ichikawa | ............ | H04N 5/7458 |
| | | | | 353/33 |
| 2010/0045690 A1* | 2/2010 | Handschy | ............ | G09G 3/3629 |
| | | | | 345/549 |
| 2010/0214646 A1* | 8/2010 | Sugimoto | .......... | G02B 26/0841 |
| | | | | 359/292 |
| 2010/0315406 A1* | 12/2010 | Nose | ........................ | G09G 3/20 |
| | | | | 345/212 |
| 2011/0150501 A1* | 6/2011 | Guttag | ................. | G09G 3/3685 |
| | | | | 398/182 |
| 2012/0154370 A1* | 6/2012 | Russell | .................. | G09G 3/346 |
| | | | | 345/214 |

\* cited by examiner

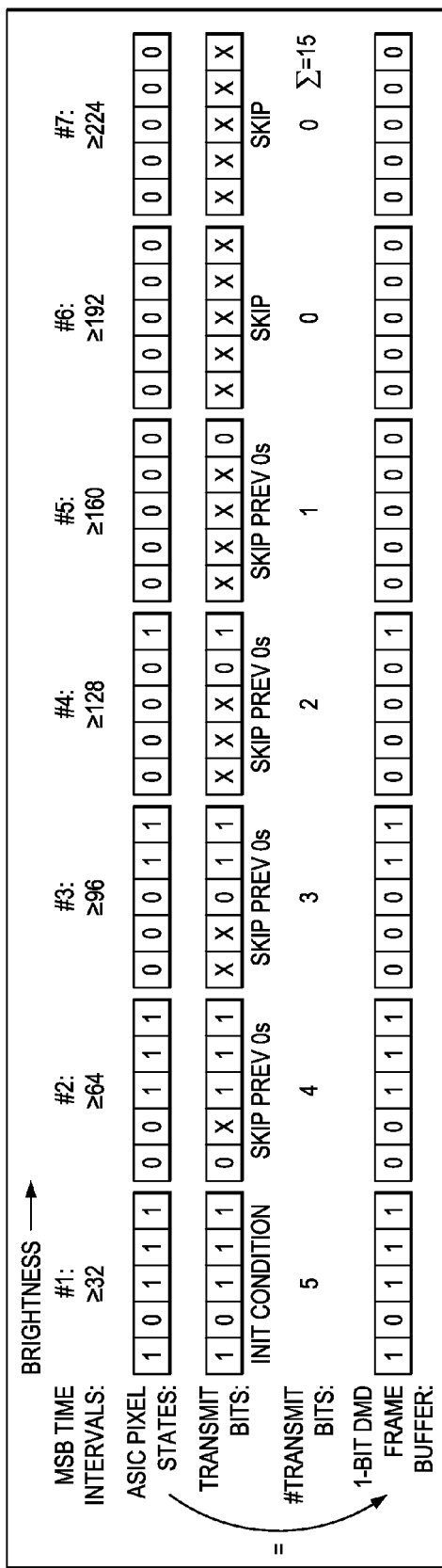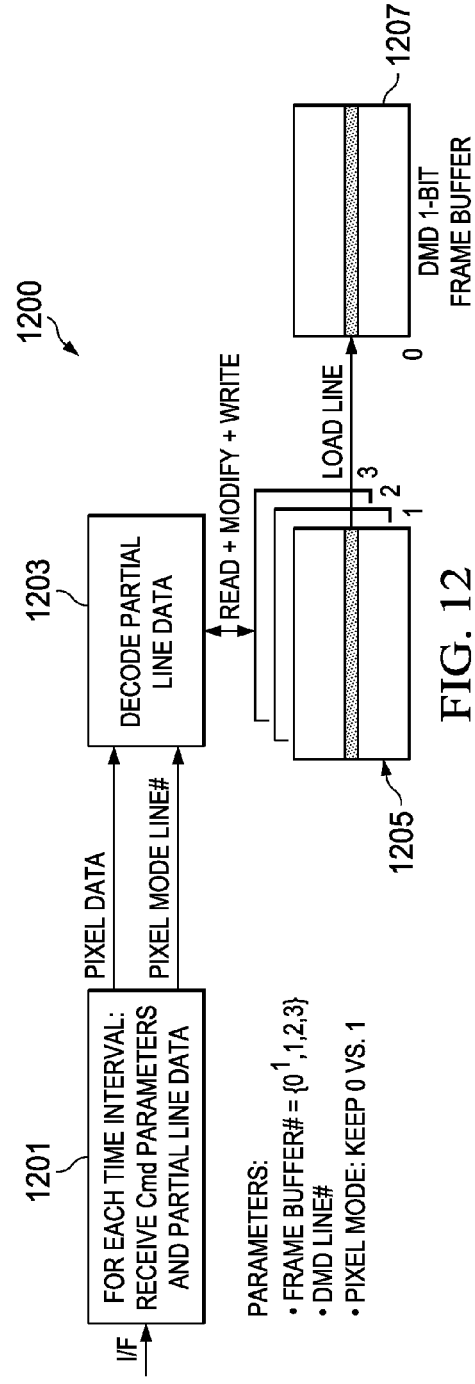

METHODS AND APPARATUS FOR REDUCED BANDWIDTH PULSE WIDTH MODULATION

RELATED APPLICATIONS

This patent application claims priority to U.S. Provisional Patent Application Ser. No. 61/943,097, entitled "REDUCED BANDWIDTH PULSE WIDTH MODULATION", filed on Feb. 21, 2014, which is hereby incorporated by reference herein in its entirety.

TECHNICAL FIELD

Aspects of the present application relate generally to the use of optical devices for image projection. More particularly, aspects of the present application are directed to applications for digital image projection optical devices where reduced power consumption is of particular importance, such as in portable projection devices or when using battery powered devices including a projector.

BACKGROUND

In projecting images using an optical projector having one or more spatial light modulators, various lamps, lenses, reflectors and spatial light modulators such as digital micro-mirror devices (DMD), liquid crystal display (LCD) and liquid-crystal-on-silicon (LCoS) devices are often used. The optical projection systems are typically formed in two parts: an illumination system for generating and collecting the light rays needed to illuminate an image, and a projection system for collecting the illuminated image light rays into a projection lens and then projecting the final image out of the compact optical device. At least one spatial light modulator device receives the illumination light rays from the illumination system, modulates the light received with image data for visual display, and transmits image light rays for projection to the projection system. In many systems the spatial light modulator is an array of reflective pixel elements such as mirrors that receive digital image data and reflect or don't reflect the illumination light corresponding to the digital image data.

There are several challenges associated with providing an optical projection feature in a battery powered device such as a portable projector, tablet, laptop or smartphone using prior known solutions. Because the device often operates on battery power, there is a continuing need to reduce the power consumed to extend battery life between charges. Brightness is often also a consideration. The projector brightness efficiency performance metric, which can be for example lumens/Watt, must be optimized.

In order to further illustrate the operation of the prior known solutions, FIG. 1 depicts in a system block diagram a top view or plan view of a prior known projection system 40. System 40 is configured using conventional reverse total internal reflection (RTIR) projection architecture. In an RTIR architecture, a reverse total internal reflection (RTIR) prism is used in a projection path between a spatial light modulator and the projection optics, as is further described below. However, the arrangements of the present application are not limited to a particular illumination system or projection system, and FIG. 1 is presented as a non-limiting example of a typical projection system for illustration only.

In the projection system 40, illumination is provided as shown as provided by the use of red, green and blue (RGB) LEDs 42, 43 and 46. However, alternative illumination sources can also be used, such as incandescent lamps with reflectors, single lamps with color wheels, laser, laser-phosphor illumination, and the like. The LEDs can include an optical coating or collimating optics 41 which act to collect and collimate the light output by the LEDs. Also, as illustrated in FIG. 1, two LEDs 42 and 46 are shown on a single integrated device, these can be the red and green LED devices, for example, while the blue LED 43 is provided as a separate component. In alternative systems three individual LEDs are used, and two dichroic plates in the form of an X box shape can be used to combine the three colors (RGB) into an illumination source. In the particular example shown in FIG. 1, dichroic plate 48 reflects the light from red LED 46 at one surface, reflects the light from green LED 42 at a second surface, and passes the light from blue LED 43 through and to the illumination path. Note that in alternative arrangements, many LEDs can be used or multiple LEDs can be used instead of one LED for each color.

In FIG. 1, an additional collimator 49 for example is placed between the LEDs 42, 46 and the dichroic plate 48. Collimators are well known and perform the function of reducing the beam diverging angle. Integrator 47 is placed in the illumination path after the dichroic plate. The integrator 47 may be a "flys-eye" integrator (also referred to as a lens array), or a rod integrator or tube integrator. The integrator 47 produces a more homogeneous light beam which can then be transmitted through one or more relay lenses such as relay 51. The relay optics such as 51 can extend the length of the illumination path.

Mirror 61 is provided and in this particular example arrangement, folds the illumination light path. This reflective fold mirror also enables the illumination light rays to reach the spatial light modulator 73, which in this example can be a digital micro-mirror device, at an angle. Because the digital micro-mirror (DMD) 73 modulates the light by tilting reflective mirrors, the illumination rays must strike the mirrors at an angle. Use of the folding mirror 61 makes control of the angle of the illumination rays to the spatial light modulator 73 easier to achieve. Additional relay optics such as 52 can be placed between the mirror 61 and the DMD 73.

Use of a reflective spatial light modulator such as DMD 73 requires that the illumination light rays from mirror 61 that are entering the DMD package and the reflected image light rays leaving the DMD mirrors in spatial light modulator 73 be physically separated to avoid interference, as can be seen by examining FIG. 1. As is known in the art, the use of an RTIR prism can separate the incoming rays from the illumination system from the image rays that are being transmitted into the projection optics. U.S. Pat. No. 5,309,188, entitled "Coupling Prism Assembly and Projection System Using Same," which is hereby incorporated by reference in its entirety herein, discloses a prism arrangement using total internal reflection to separate the illumination and projection light paths in a small space. As shown in FIG. 1, wedge prism 75 and TIR prism 76 form a coupling prism that accomplishes the needed separation of the illumination light rays directed onto the spatial light modulator from the image light rays coming from the spatial light modulator. The image light rays exit prism 76 and are coupled into a projection system that includes elements 54, 56, and 59

FIG. 2 depicts in a simple circuit block diagram a typical arrangement 200 for use with the compact optical projection system described above. A microprocessor, mixed signal processor, digital signal processor, microcontroller or other programmable device 211 is provided and executes instructions that cause it to output digital video signals for display. A variety of sources may provide the digital video signals labeled DVI in the figure, including television transmitters, cable boxes, internet browsers, stored files in video cards, flash cards, USB drives and the like, cameras, computers and camcorders, etc. The microprocessor 211 is coupled to a digital DMD controller circuit 203. DMD controller 203 is another digital video processing integrated circuit. Sometimes this controller 203 can be implemented using a customized integrated circuit or an application specific integrated circuit (ASIC). An analog circuit configured to manage power and LED illumination referred to as a power management integrated circuit (PMIC) and numbered 215 is also provided. The PMIC 215 controls the intensity and power to the LEDs 209. The DMD controller 203 provides digital data to the DMD 201 for modulating the illumination light that strikes the DMD surface, and the PMIC DMD controller 215 also provides power and analog signals to the DMD 201. The light rays from the illumination sources LEDs 209 are input to illumination components in block 215 such as the cover prism and wedge described above, and strike the reflective mirrors inside the package of DMD 201. The reflected light for projection leaves the surface of the DMD 201 and travels into the projection optics 207 which operate to project the image as described above. Together the integrated circuits 203, 215 cause the DMD 201 and the optical components 215, 207 to operate to project the digital video signals as an image.

Example integrated circuits that can be used in the circuit shown in FIG. 2 include DMD controller ICs from Texas Instruments Incorporated. The DMD controller ICs that can be used include, for example, the DLPC3430 DMD controller, and the DLPC2601 ASIC device that can provide both digital and analog controller functions. Analog DMD controller devices from Texas Instruments, Incorporated that can be used include the DLPA2000 device. LED controller devices can be used to power on and off the RGB LEDs, for example.

The spatial light modulators can be implemented with DMD devices from Texas Instruments, Incorporated such as the DLP2010DMD, which is a 0.2 inch diagonal device that provides wide VGA (WVGA) resolution. Many other DMD devices are available from Texas Instruments Incorporated that can be used in digital projection systems.

In FIG. 2, a high speed interface labeled "I/F" is used to couple signals from the DMD controller or ASIC 203 to the DMD device 201. In a prior known approach, a complete set of pixel data is transmitted to the DMD many times per second, for example if the incoming data frame rate is 60 Hz, the interface receives pixel image data for three different colors (red, green, blue, for example) 60 times per second. In the prior known approaches, there is no processing used to compress or reduce the data rate on the interface I/F between the DMD ASIC 203 and the DMD 201. As the devices are typically implemented in CMOS technology, the power consumed is directly proportional to the switching speed. Thus as the pixel data is transmitted on this high speed interface, the driving devices switch on and off and consume power. This power is consumed even when the system is projecting a static image. For example, during a power point presentation, the image projected can remain static for many frame cycles. The constant transmission of pixel data from the DMD ASIC 203 to the DMD 201 causes substantial power consumption with no additional benefit, as the image viewed at the screen (in cases where the image displayed does not change) remains the same over many frame periods.

In order to further explain the arrangements of the present application, additional concepts related to the use of pulse width modulation as applied to the display of images using a spatial light modulator, such as a DMD, are now presented.

The use of digital data for image display is convenient for processing and storage, and projecting data from a frame buffer at discrete time periods is very practical when using a pixel array formed of addressable elements that "latch" the current value. However the human visual system (HVS) is an analog system and so, if unwanted visible artifacts that appear to the viewer due to the use of digital image data are to be avoided, certain steps are necessary to break up the images into smaller portions that update frequently.

A "frame display time" can be determined using the typical metric of "60 frames per second" as the minimum display rate needed for the human visual system to see continuous motion in an image displayed for viewing. However, particularly when color is used and some portions of the image have multiple colors, faster frame rates are known to reduce or avoid "rainbows" and other visible artifacts that can sometimes be observed. For example, a 2× rate of 120 frames per second may be used.

Further "bit planes" or "sub-fields" can be defined to format the images for the spatial light modulator and also to further improve the images for display to the HVS. Because the pixel elements for a binary spatial light modulator are either "on" or "off", the intensity observed for a particular pixel is determined by the amount of time that pixel is on during the frame display time. The image data coming into the ASIC device may have several bits for each pixel, for each of the colors, to represent color intensity for a particular frame. A binary spatial light modulator can only process one bit per pixel for each image, so a mapping is performed to create the intensity levels needed for each pixel during the frame display time at the spatial light modulator. By subdividing the frame display time into bit planes, each having a bit for each of the pixels in the two dimensional array at the spatial light modulator, a variety of intensities, corresponding to a "gray scale" for one color, can be achieved. If the pixel is "on" for the entire display time, it will have a maximum brightness or intensity. If the pixel is "off" for the entire time, it will be dark, or have a minimum brightness or intensity. By using the bit planes, the entire range of color intensity available can be reproduced using the one bit per pixel available in the spatial light modulator.

Further, the bit planes may have non-uniform display times associated with them. In this manner a weighting function is implemented. A first bit plane may be displayed for half the frame time, a second for one quarter, a third for a smaller portion, and a fourth for a still smaller time portion, for example.

In addition, to further adapt the display of the bit planes to the workings of the human visual system, the bit plane display times can be broken up so that, in the above example, the first bit plane is displayed twice in a rotation, for two different times, thus the visual image being displayed updates more frequently. The HVS will see fewer artifacts with additional breaks in the image being projected. Because the time each bit plane is displayed at the DMD is non-uniform, the pulses transmitted to the DMD array are said to be pulse width modulated, the width of the pulses corresponding to the relative weight given a particular bit plane. The pulse width modulation therefore controls the intensity for the pixels.

In a further aspect of the prior known image display projection systems using binary spatial light modulators, these SLMs have only one bit per pixel of image storage. In use, the picture elements, or pixels, contain a latch and a reflective device associated with the latch, such as a mirror. In conventional devices there is a one bit storage cell associated with the pixel as well. While a particular pixel frame is being displayed by the pixel, a single bit memory cell located adjacent to the pixel is loaded with the next pixel value for display. When the line or the array of pixel data is loaded, a "reset" will cause all of the pixel elements to update (latch) the next value for display, and the one bit storage loading process can begin again.

Because the SLM has little internal storage, the DMD controller circuit necessarily transmits multiple bit planes to the SLM for each pixel during each frame display time period, and these bit planes often contain redundant or repeated data.

FIG. 3 illustrates a system 300 and portions of the data path for a conventional digital imaging system using a DMD controller ASIC 301 and a SLM device 303, for further explanation.

In FIG. 3, the DMD controller 301 receives pixel data. A block 311 converts the incoming pixel data, which has multiple bits for each color for each pixel, these are mapped into images referred to as bit planes. In an example, a frame for display can include colors red, green and blue and can include, in one example, 8 bits per pixel for each color or 24 bits for each pixel. The conversion block 311 converts the image frame data received by the ASIC into bit planes and stores the bit planes in a frame buffer 305. In addition, the data can be formatted prior to writing the data to the frame buffer 305. In a second frame buffer 307, the data is read from the frame buffer 305. By switching between the two frame buffers, the frame being read for transmission to the SLM is separated from the frame being written with bit planes corresponding to the incoming frame image data, enabling the system to operate continuously, receiving data, converting and writing bit planes to a first frame buffer, while simultaneously reading bit plane data from a previously loaded frame buffer. After the data is read from the frame buffer such as 307 in FIG. 3, additional data formatting can be performed to ready the data for transmission on the high speed interface I/F. For example, in a packet data interface, the data packets can be formed.

In order to ready the image data for display for viewing by the HVS, as explained above, a plurality of bit planes are displayed during each frame display time period. The bit planes can include three colors for each pixel and are arranged so as to create the desired pixel intensity. In order to break up the changes in the image to provide better displayed image quality with few or no visible artifacts, the number of bit planes transmitted to the SLM is increased from 24 (8 bits per pixel for 3 colors) to 60 or more, with some repeating. In a typical application, some of the bit planes are repeated, and since the known prior solutions do not make any correlation between the data transmitted for the various ones of the bit planes, all of the pixel data for each bit plane is transmitted over the data interface I/F in FIG. 3 to the SLM device 303. Blocks 311 and 315 in the controller circuit 301 provide formatting that creates the bit planes from the read frame buffer and then transmits these bit planes to the SLM 303 on the data interface labeled I/F.

As shown in FIG. 3, the SLM 303 includes high speed logic 317 and a data receiver 319. The data transmitted from the DMD controller 301 is received by the high speed logic 317 which writes the storage cells for the mirror array 319, and when the entire array, a line, or another portion is ready, a "reset" to the DMD pixels causes them to update with the data from the storage cells and display the new image corresponding to the bit plane. The load and reset process is repeated for all of the bit planes for a particular image display time to provide the color and intensity information for viewing by the HVS. The image is displayed by illuminating the DMD mirrors and the reflected images are projected for viewing at screen 309 for example. The display is reset each time a bit plane is loaded so that all of the bit planes for a given frame are displayed in a sequence during the frame display time.

In an example with an image display having four bit planes, referred to as bit planes 0-3 for a given color that are to be displayed during a predetermined color display time, each bit plane has an associated time weighting. For a four bit plane example, the weights might be 1, 2, 4, and 8. Base on the sum of the time weights, in this example the sum is 15, the associated time proportion for bit planes 0, 1, 2, 3 might be 1/15, 2/15/, 4/15, 8/15. When a particular bit plane is displayed with multiple instances, its total display time will still match the corresponding display proportion. When a bit plane is displayed with more than one instance in a display time, the bit plane is referred to as being "split". For example, in a bit plane sequence of '30213' bit plane 3 is a split bit plane.

In a typical bit splitting approach, when the prior known solutions are used, the same pixel in the SLM is re-loaded multiple times during the color portion of the frame display time. This means the data corresponding to that pixel are all transmitted from the DMD controller 301 to the spatial light modulator device including the DMD over the high speed interface I/F for each of the bit planes, in this example, 5 times (a sequence of 30123). If the binary data within each of these bit planes is independent, then the entire 2D bit plane must be transmitted for each of the 5 bit planes. Since there is no correlation between the data contained within each bit plane, all of the binary states must be transmitted for each bit plane instance. A system having correlation between bit planes could result in the decreased transmission, resulting in power reduction.

Improvements in the power consumption for optical projection systems are therefore needed in order to address the deficiencies and the disadvantages of the prior known approaches and to further improve performance. Solutions are needed that reduce the power consumed, reduce the data transmitted on the interface between the DMD controller and the spatial light modulator, and which extend the battery life for portable devices, while overall system performance is maintained or improved.

SUMMARY

Various aspects of the present application provide optical projection systems and components for optical projection with reduced bandwidth pulse width modulation that address the deficiencies of the prior known approaches. Novel compression methods and arrangements are provided herein which include determining image data that can be compressed prior to transmission to a spatial light modulator over a data interface. A digital controller device is provided and configured to perform encoding on the image data, and then transmits a reduced bandwidth pulse width modulated data to the spatial light modulator. The spatial light modulator then operates by receiving the reduced bandwidth data, decoding the received data to form line buffer data, loading a pixel array with the line buffer data, and updating the pixel array with the unencoded data for image display. In some arrangements, additional storage is provided as frame buffers on the spatial light modulator to further enhance the amount of data compression achieved.

In one aspect of the present application, a method for data compression in a digital image projection system includes: providing a digital controller coupled to a spatial light modulator by a data interface wherein the spatial light modulator further comprises a two dimensional array of pixels; receiving signals containing image data at the digital controller; processing the image data to form frame images and storing the frame images in a frame buffer coupled to the digital controller; using frame images retrieved from the frame buffer, forming bit plane images each corresponding to a sequence of bit planes to be displayed by the spatial light modulator during an image display time; selecting a line of bits from a selected one of the bit plane images for transmission to the spatial light modulator over the data interface; comparing the selected line of bits to a previously transmitted line of bits, and if there is a match, moving to another line of bits for transmission to the spatial light modulator; if there is no match in the comparing, partitioning the selected line of bits into a plurality of line segments for transmission over the data interface to the spatial light modulator; determining, for each of the line segments, whether data compression is possible; responsive to the determining indicating data compression is possible, transmitting an encoded message to the spatial light modulator indicating a compressed data type is to be used for a selected line segment; and responsive to the determining indicating no data compression is possible, transmitting unencoded bits corresponding to the selected line segment to the spatial light modulator.

In another aspect of the present application, a method for data compression in an image display system using a spatial light modulator includes: providing a digital controller coupled to a spatial light modulator by a data interface, wherein the spatial light modulator further comprises a two dimensional array of pixels; receiving signals containing image data at the digital controller; processing the received signals to form frame images, and storing the frame images in a frame buffer coupled to the digital controller; using stored frame images retrieved from the frame buffer, forming a plurality of bit plane images each corresponding to a sequence of bit planes to be displayed by the spatial light modulator during an image display time, the sequence of bit planes including an LSB portion and a non-LSB portion for each pixel in the spatial light modulator, the non-LSB portion being formed as a sequence of bits corresponding to uniform time intervals that are portions of the image display time, the non-LSB portion using a thermometer code arranged such that for a particular bit position in a non-LSB portion, the sequence for the uniform time intervals corresponds to an intensity for a selected pixel in the spatial light modulator; using a data compression scheme, forming encoded data corresponding to the non-LSB portions of the bit planes; and for each line of the bit planes, transmitting encoded data forming partial lines over the data interface to the spatial light modulator, and transmitting control signals indicating the encoding scheme used to form the partial lines to the spatial light modulator.

In yet another aspect of the present application, a system for displaying images using data compression includes providing a digital controller circuit coupled to a data interface, the digital controller circuit configured to receive image data for display and further configured to form bit planes comprising lines of data to transmit to a spatial light modulator over the data interface, the digital controller circuit further configured to encode data for transmission to the spatial light modulator using a data compression scheme; and a spatial light modulator circuit coupled to the data interface, the spatial light modulator circuit configured to receive encoded data from the digital controller circuit and to decode the encoded data to produce unencoded data corresponding to pixel data for display on an array of pixel elements in the spatial light modulator; wherein data transmitted from the digital controller circuit to the spatial light modulator further comprises encoded data that is formed from the bit planes using a data compression scheme to form partial lines of data.

In a further aspect of the present application, a system is provided that includes a digital controller circuit coupled to a data interface, the digital controller circuit configured to receive image data for display and configured to form bit planes comprising lines of data to transmit to a spatial light modulator circuit over the data interface, the digital controller circuit further configured to encode data for transmission to the spatial light modulator using a data compression scheme; and the spatial light modulator coupled to the data interface and configured to receive encoded data and to decode the encoded data to produce unencoded data corresponding to pixel data for display on an array of pixel elements in the spatial light modulator, the spatial light modulator circuit further including a plurality of frame buffers for storing pixel data for display; wherein data transmitted from the digital controller circuit to the spatial light modulator further comprises encoded data that is formed from the bit planes using a data compression scheme to form partial lines of data.

Recognition is made in aspects of this application of solutions for providing an optical projection system with reduced power consumption resulting from data compression for the data to be transmitted to the spatial light modulator. The novel compression techniques enable greatly reduced data transmission on the interface to the spatial light modulator, thereby advantageously saving power, increasing the battery life of battery powered, portable projection systems, and further enabling the increased use of embedded optical projectors, particularly in small form factor portable devices that are battery powered.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIG. 12 depicts in a flow diagram a novel method for receiving and decoding data in an optical projection system incorporating additional features of the present application;

FIG. 13 depicts in another timing diagram a sequence illustrating the transmission of encoded data in an optical projection system incorporating additional features of the present application;

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled." Further, in some instances in this application a description of a data transmission may refer to a "line". However for purposes of this application, the term "line" can also refer to a row or column and these terms can be used interchangeably herein. While some DMD controllers which can be used in the arrangements of the present application transmit lines of data, others transmit columns, and a "row" and a "column" of pixels in a DMD are also interchangeable and the terms "line", "row" and "column" can all be used.

Figure 1:
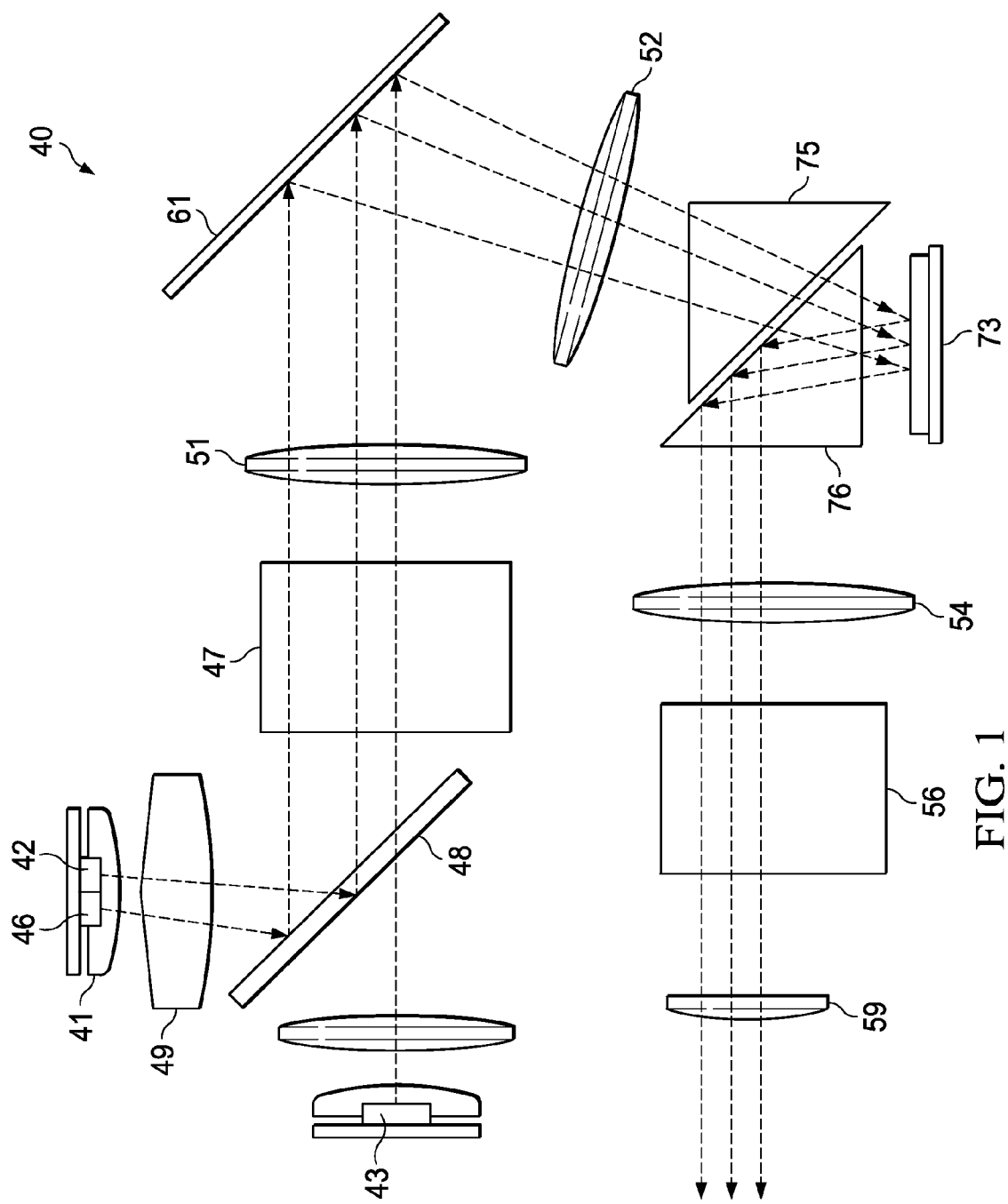
FIG. 1 illustrates in a simplified block diagram a device incorporating an embedded optical projection system illustrated for describing various aspects of the present application.
Figure 2:
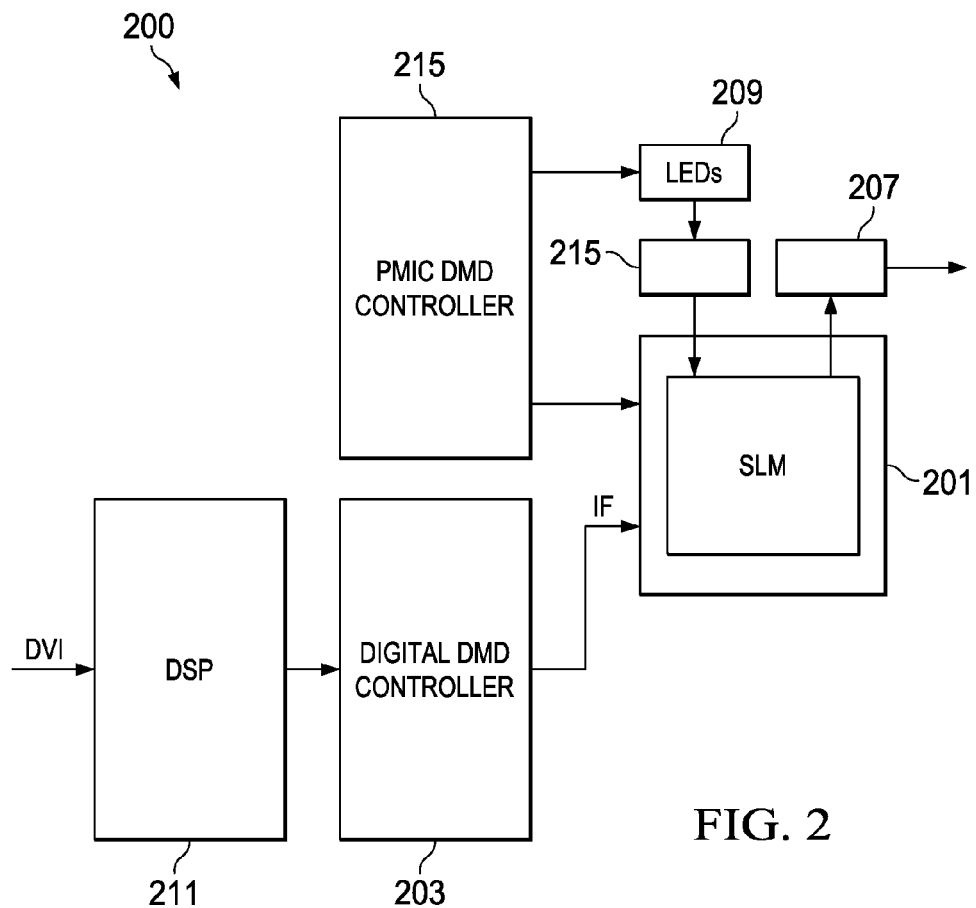
FIG. 2 illustrates in simplified block diagram a portion of a prior known projection system.
Figure 3:
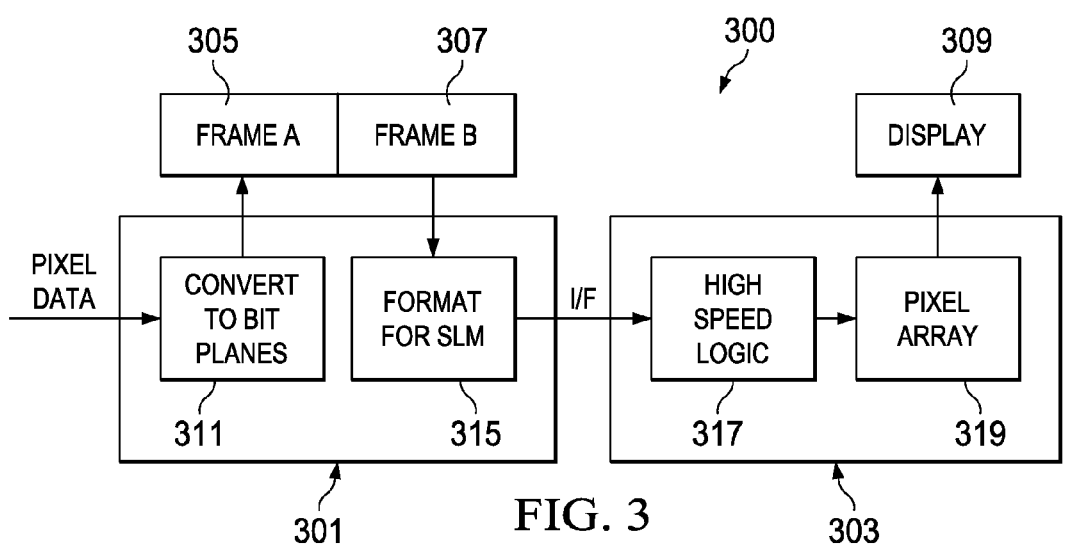
FIG. 3 illustrates in a simplified block diagram a datapath portion of a prior known optical projection system.
Figure 4:
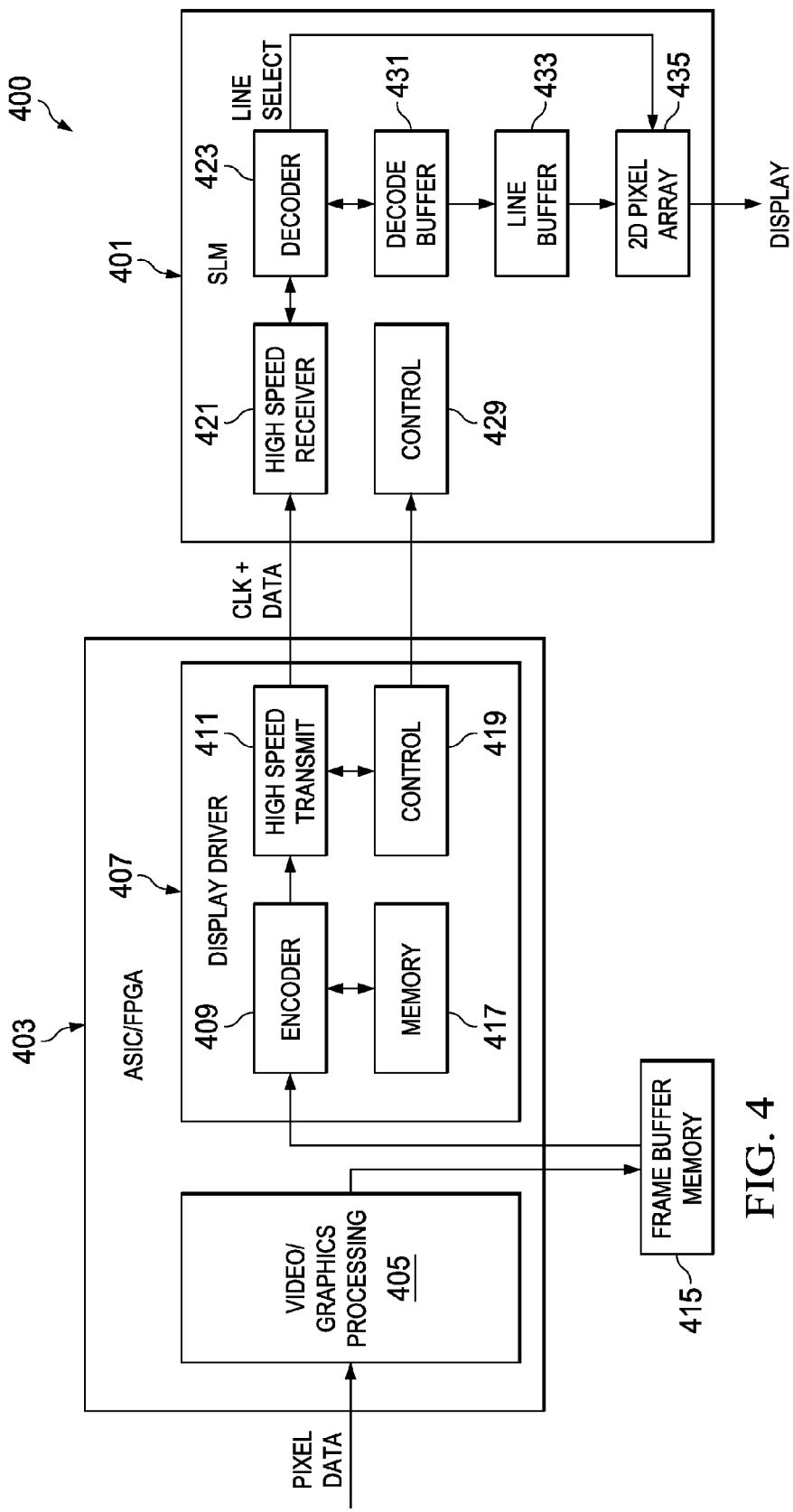
FIG. 4 illustrates in a simplified block diagram an example arrangement for an image projection system incorporating aspects of the present application.

FIG. 4 illustrates, in a system block diagram, an example image projection system 400 incorporating aspects of the present application. In FIG. 4, a digital controller 403 (which can be, in one example arrangement, implemented as an ASIC or field programmable gate array (labeled ASIC/FPGA), for example) is coupled to a spatial light modulator (SLM) 401 by a high speed data interface labeled "Clk+Data". The high speed data interface can be provided as a low voltage differential signal (LVDS) bus interface, for example, which uses a differential voltage over a pair of wires to convey data. LVDS signals are used in digital projection systems and television and computer systems, however the high speed interface bus can be implemented using alternative bus arrangements for transmitting data. A sub-LVDS bus interface can be used as an alternative to an LVDS bus interface, where a common mode voltage is less than 1 Volt, for example, however the arrangements of the present application are not so limited. The digital controller 403 includes a video and graphics processing block 405, which receives incoming image frame data labeled "Pixel Data" that includes image data for display, a memory interface coupled to a frame buffer memory 415, and a display driver block 407. The display driver block 407 includes an Encoder function 409, which has a local memory 417, and a high speed transmission block 411 that receives the encoded data and forms packets or data words for transmission over the high speed data interface "Clk+Data". A control block 419 is coupled to the High Speed Transmit block 411. Control block 419 is further coupled to a similar control block 429 in the spatial light modulator 401.

The SLM 401 in this example arrangement receives the data from the High Speed Transmit block 411 over the data interface at the block labeled "High Speed Receiver" 421. The received data is then decoded by the Decoder block 423. A Decode Buffer 431 and a Line Buffer 433 are then used to transmit the decoded data to the individual pixels in the spatial light modulator, which are arranged in a 2 dimensional pixel array 435 labeled "2D Pixel Array" in FIG. 4.

The illustrative arrangement depicted in FIG. 4 as an example system 400 incorporates aspects of the present application. In sharp contrast to the projection systems of the prior art, in system 400 the high speed data interface between the digital controller 403 and the SLM 401 uses encoded data for at least some of the messages transmitted. The encoding provides data compression features. By reducing the amount of data needed for transmission over the "Clk+DATA" high speed data interface, the amount of power consumed by the system 400 can be greatly reduced. The display system can be used, for example, to project static images such as presentation slides, spreadsheets, graphs and the like. When a static image is displayed, the arrangements of FIG. 4 will not transmit data every time period for a bit plane, but instead for the portions of a bit plane where no change occurs between time periods, the SLM 401 will not receive any data for such lines and the high speed interface can be idled during the time that would normally be associated with the transmission time. When the DMD controller 403 determines that the SLM already has the correct data for a line being readied for transmission, the DMD controller 403 will skip the transmission of data for that line, and the interface "Clk+Data" can be idled, saving considerable power that would have otherwise been used to transmit the data. The data transmit function, and the high speed receiver 421 in SLM 401, can all be idled for the transmission time for any line that is already in place in the 2D pixel array. As described further below, in cases where there is a large correlation between the data for adjacent lines, the DMD controller ASIC 403 can command the SLM 401 to simply repeat the prior line, again saving power that would have been used to transmit the data on the interface. For cases where adjacent lines contain identical data, the interface "Clk+Data" then need only transmit a short "repeat" message for each line in the line buffer, and the amount of data transmitted is substantially reduced, hence the power consumed at the high speed interface is also correspondingly greatly reduced.

Figure 5:
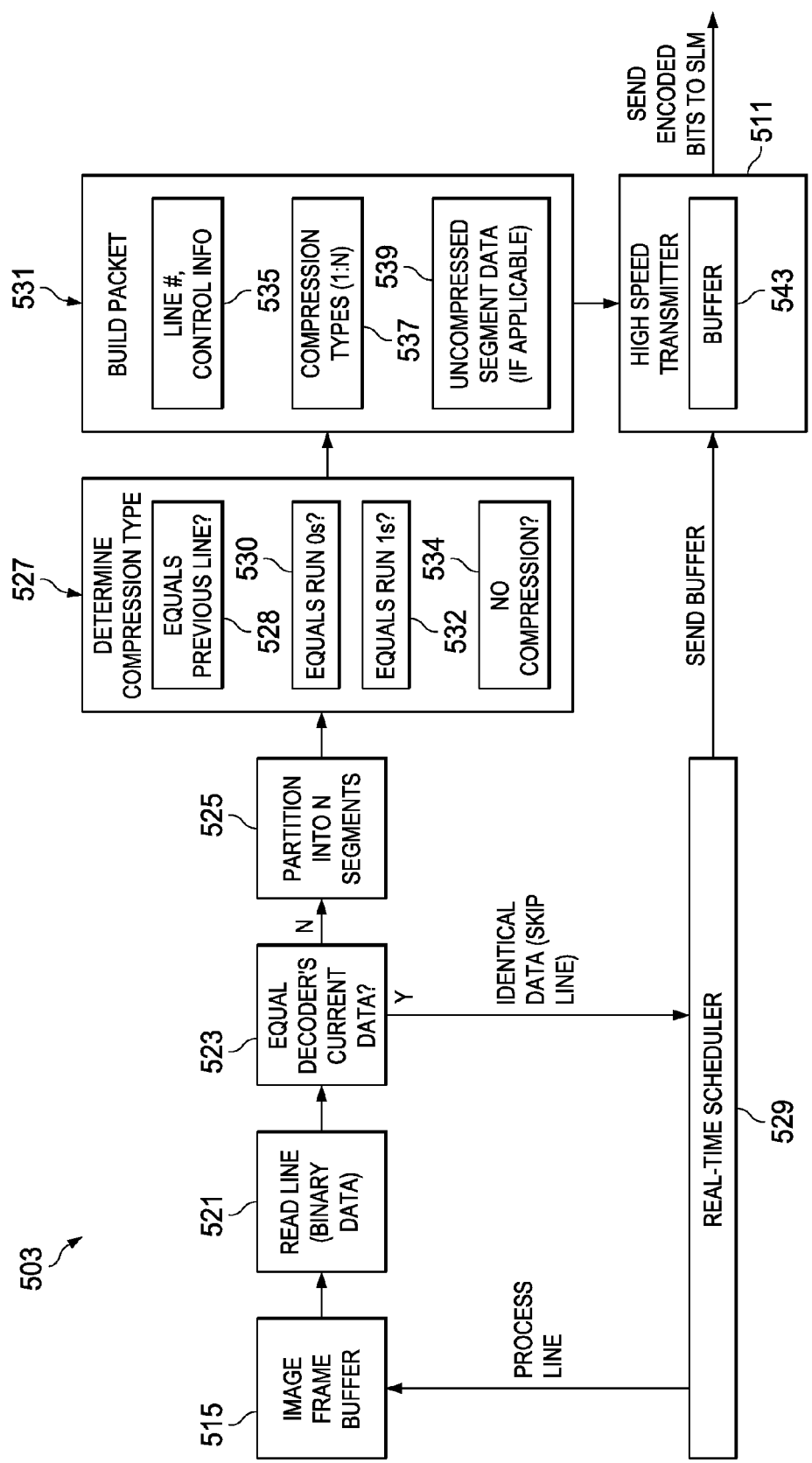
FIG. 5 illustrates in a simplified block diagram an example illustrative arrangement of a novel image data encoding portion of an image projection system incorporating certain features of the present application.

FIG. 5 illustrates, in a block diagram, portions of the ASIC 403 of FIG. 4, for example, as an encoding system 503. The various blocks of FIG. 5 are described by the function performed. These blocks can be implemented, for example, using dedicated hardware such as dedicated logic gates arranged in the digital controller or ASIC. Digital circuitry such as registers, stacks, multipliers, ALUs, comparators and the like can be used. In alternative arrangements that form additional aspects of the present application, the blocks shown in FIG. 5 can be formed using programmable logic including controllers or microprocessors within the digital controller or ASIC. In addition, instructions needed to cause the blocks to perform the functions described can be stored within the ASIC. These instructions can be provided as firmware, machine code, software or the like. If the instructions are not stored within the ASIC, an external memory can be provided and coupled to the ASIC, this can be non-volatile memory such as a FLASH, ROM, EEPROM or other memory suitable for storing and retrieving program instructions.

In FIG. 5, an image frame buffer 515 contains data corresponding to frames for display. A real time scheduler 529 is coupled to the image frame buffer 515 and selects a line of image data stored in the image frame buffer 515 for processing. The data corresponding to the selected line is read from the image frame buffer 515 and is then input as read data into a read line buffer 521. A comparator 523 compares the read line data in buffer 521 to the current data present in the receiver's decoder for the same spatial location in the pixel array, which is the line image data from the prior time interval for the same line. If the selected line has the same data as the prior line data, the real time scheduler 529 can simply skip this line. Since before the transmission of data on the high speed interface, the transmitter 511 sends a message indicating a line number, in the case where the line is the same data as that already present in the pixel array, the line number is simply incremented skipping the current line, and the current data remains in the pixel array. This is a form of compression that is optimal since no data is transmitted. The digital controller device can simply "do nothing" for the present line. The spatial light modulator 401 in FIG. 5 is already storing the correct data in this case, for the particular line. The data interface including the transmitter, and the receiver, can therefore be put in a low power or sleep mode for the time the data for this line would have otherwise been transmitted, saving very significant power. If several lines are repeated so that the data is already present in the pixel array, all of these lines will be skipped. When a new line needs to be transmitted, the digital controller first transmits a line number to the spatial light modulator, which causes the receiver to begin receiving data for the line number indicated. Block 523 can also indicate that the new data line does not match the prior line and in that case, encoding is required. At block 525, the line is partitioned into line segments. In one illustrative example arrangement, the read line in buffer 521 can be partitioned into 64-pixel segments, however alternative arrangements can use bigger or smaller pixel segment sizes. In another alternative arrangement, the segment size can be a dynamic size that varies with the data being transmitted, for example. The line length can be as long as needed for a particular spatial light modulator and can correspond to a row, or to a column, in the two dimensional array in the spatial light modulator depending on the system characteristics.

In block 527, each of the line segments is evaluated for the possibility of applying additional data compression. In a block 528, a comparison is performed to determine if the segment is all "1's", in that case a "run 1s" message can be transmitted over the data interface. This message indicates to the receiver that every bit in the selected segment is a "1" without the need for actually transmitting all the "1s" over the high speed data interface. In another example, block 530 identifies segments with all zeros, and then the block 527 can indicate that the transmitter 511 can transmit a "run 0's" message over the high speed data interface. The "run 0's" message indicates that all of the bits in the segment are zero and by sending the message, instead of transmitting the actual "0's", the power needed by the data interface and the amount of data needed to be transmitted is substantially reduced.

In another case, the block 532 in the "Determine Compression Type" block 527 identifies a segment that is equal to the previous line, in the block labeled "Equals previous line?" When the selected segment is equal to the previous segment, a short message indicating that condition can be transmitted, instead of transmitting the segment data bits, again reducing the power needed to transmit the message and the data on the interface. Finally, if none of these cases applies as determined in block 534, then for this particular segment, no compression is available, and block 527 can send that information to the next block, the "Build Packet" block, numbered 531.

In FIG. 5, block 531 builds a packet for transmission on the high speed interface between the digital controller and the SLM. A packet of data is formed in block 531 and includes forming a packet with the line# in the block 535, additional control information, and for each pixel segment, the type of compression which can be indicated by a numeric value from 1 to N (or by another symbol that is understood by a receiver located in the SLM) in block 537, and in the case where no data compression was performed, the uncompressed data for the selected segment can be appended to the packet for transmission over the high speed interface in block 539.

Block 511 is the transmitter block for the digital controller and is coupled to the high speed interface for communication of the encoded data bits to the SLM. A buffer 543 can be used to form a queue of packets for transmission over the high speed interface. In an example non-limiting arrangement that forms an aspect of the present application, the data is transmitted using an LVDS data interface that can include one, or several, twisted pairs for transmitting different data at a low voltage. However, the aspects of the present application are not limited to a particular interface type and the data can be transmitted to the SLM using other interfaces, and use of alternative interfaces forms additional arrangements that are also contemplated as aspects of the present application. Reduction of the amount of data transmitted will reduce the power consumed for any data interface used.

Figure 6:
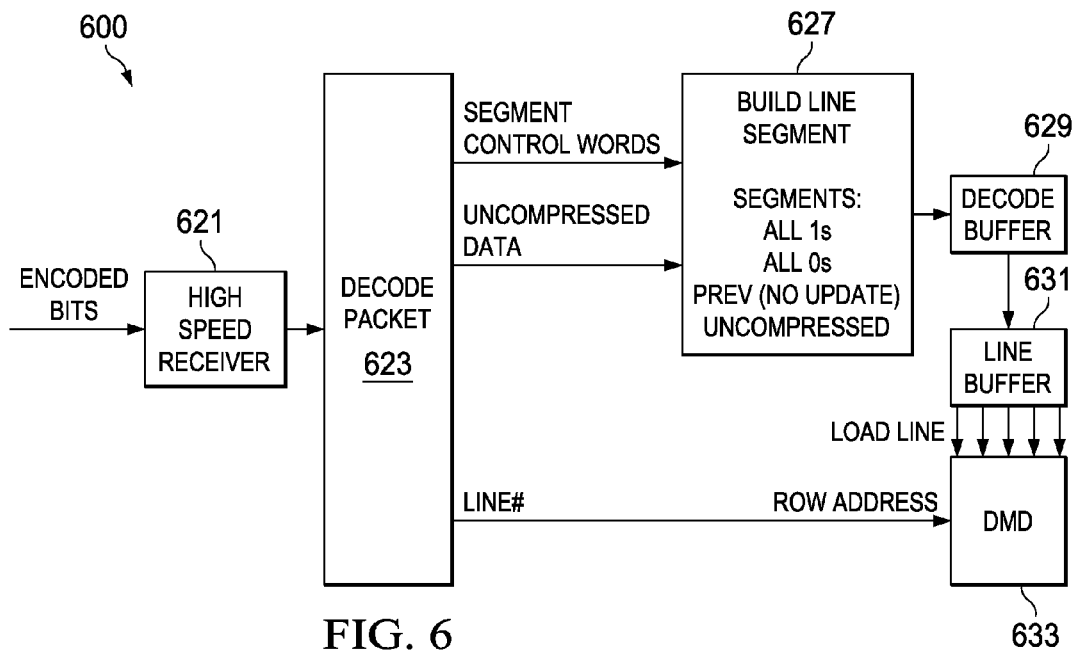
FIG. 6 illustrates in a block diagram a portion of a novel data receiver device with decoding of data incorporating certain aspects of the present application.

FIG. 6 illustrates in a system block diagram 600 an arrangement for providing a spatial light modulator including a receiver that includes aspects of the present application. As in FIG. 4, these blocks of system 600 can be implemented, for example, using dedicated hardware such as logic gates arranged in the digital controller or ASIC. In alternative arrangements that form additional aspects of the present application, the blocks shown in FIG. 6 can be formed using programmable logic including controllers or microprocessors within the SLM. In addition, instructions needed to cause the blocks to perform the functions described can be stored within the SLM. These instructions can be provided as firmware, machine code, software or the like. If the instructions are not stored within the SLM, an external memory can be provided and coupled to the SLM, this external memory can be non-volatile memory such as a FLASH, ROM, EEPROM or other memory suitable for storing and retrieving program instructions.

In FIG. 6, block 621 is a receiver coupled to the high speed data interface and arranged to receive data packets (from the transmitter in FIG. 5). In block 623, a functional block labeled "Decode Packet" receives the encoded data packets and decodes the packets corresponding to the type of compressed data. Block 623 outputs control words to the functional block labeled "Build Line Segment" and numbered 627. The block labeled "Build Line Segment" reverses the compression performed by the controller in FIG. 5. The four types of compression are reversed in the Build Line Segment block 627. As shown in FIG. 5, the four compressed message types, "All 1's", "All 0's", "Previous Segment", and "Uncompressed" are decoded and used to form the bits in the line segment corresponding to the selected segment. If the "All 1's" message is received, the bits in the segment are all set to "1", if the "All 0's" message is received, all of the bits are set to zero in the segment. If the "Previous Segment" message is received, the current segment is formed by repeating the previous segment, and if the "Uncompressed" message is received, the uncompressed data for the segment is used.

In the functional block 629, labeled "Decode Buffer", the line segment is formed, receiving the needed data from the "Build Line Segment" block 627. As shown in FIG. 6, the decode buffer output is coupled to the line buffer 631. The line buffer 631 receives each segment, for example 64-pixel segments, as the individual segments (or compressed data corresponding to the segments) are received by the receiver 621, and decoded by the "Decode Packet" block 623, and then assembled by the "Build Line Segment" block 627 and the "Decode Buffer" block 629. Finally the completed line is loaded into the line buffer 631 which then loads the selected line in the pixel array DMD 633 in the spatial light modulator device. When the lines are all loaded into the storage cells for the pixels, a "reset" is performed that updates all of the pixels to the new values. The pixel elements, in this example DMD mirrors, include a latch and will remain in the new state until the next "reset" occurs. Illumination can then reflected from the SLM to project the images for viewing.

Because many of the segments transmitted to the spatial light modulator over the high speed interface can be compressed in the manner described above, the power consumed by the system in FIG. 4, for example, can be greatly reduced by use of the arrangements of the present application (when compared to the power consumed by the systems using the prior known approaches.)

In one aspect of the present application, the system of FIG. 6 can be used by programming devices such as the spatial light modulator or DMD 600, and the DMD controller 500 of FIG. 5, and in addition the features described above can be implemented by adding additional logic to the SLM and or the ASIC as needed to perform the compression and decompression steps described above. No process changes or physical changes to the DMD pixel array are needed to configure the SLM to perform the compressions and decompressions described above. Use of the novel arrangements can be readily implemented without process changes and without the need for changes to the physical characteristics of the DMD array, for example.

In additional arrangements described below that form additional aspects of the present application, a pulse width modulation technique is disclosed which can be used for reducing the power consumed and to reduce the amount of data transmitted between a DMD controller and a spatial light modulator including, for example, a digital micromirror device. In the arrangements, a thermometer coding scheme is used to provide pixel intensity information. Recognition is made that when transmitting a thermometer code corresponding to pixel intensity as bit planes, a transition in a pixel from an initial state to a final state can be detected in the DMD controller. Once any pixel in the 2 dimensional array has reached a final state, in the arrangements an encoding scheme can be used such that the receiver in the spatial light modulator can retain the final state for that pixel for the remaining portion of the display time, and the transmitter in the DMD controller can then reduce the amount of data transmitted and correspondingly reduce the power consumed.

Figure 7:
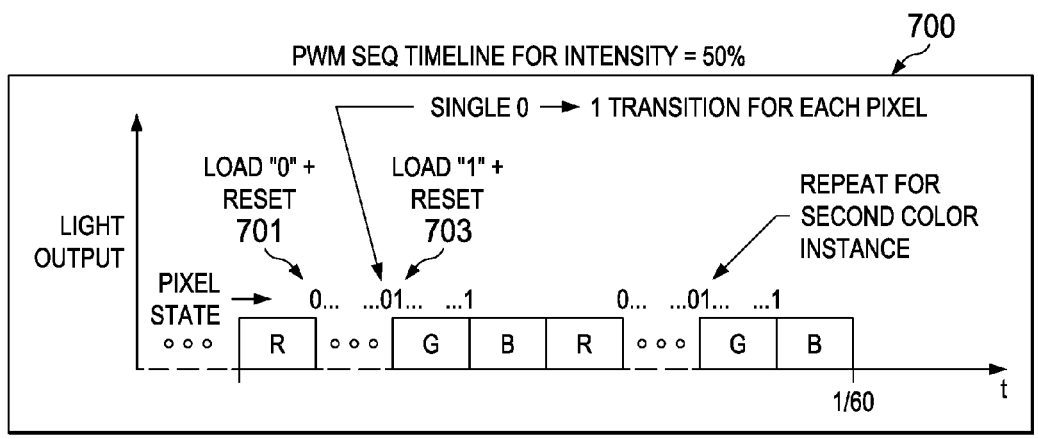
FIG. 7 illustrates in a timing diagram a pulse width modulated signal sequence illustrating aspects of the present application.

FIG. 7 depicts in a simple timing diagram 700 a sequence of pulse width modulated bit plane data for an example pixel in the DMD array. In FIG. 7, time increases from left to right. In FIG. 7, three colors (red, green, and blue, represented by "R", "G" and "B" in the figure) are shown and two cycles of RGB data are depicted. The total display time is shown at 1/60 seconds, for a 60 frame per second display time with a "2×" cycle factor for the three colors.

In FIG. 7, the intensity given by a particular pixel is determined by the duration of time that pixel is "on" during a color display time. This is represented by a sequence of 0's followed by a sequence of 1's. As the number of 1's increases during a color display time, the intensity given by a particular pixel increases.

As an example, at the end of a red display time, at 701 in FIG. 7, green pixel data is loaded as a "0" followed by a "reset" to start the green display time. Later in the sequence, the pixel is loaded with a "1" followed by a "reset" at time 703. After the pixel is set to "1" or ON, it remains in that state for the remainder of the green display time. This is shown by the text "01 . . . 1" in FIG. 7 indicating that the remaining bit planes send a "1" to that pixel.

In arrangements forming additional aspects of the present application, recognition is made that the pixel elements in a DMD in a pulse width modulated system are binary elements and that once a final condition is reached in a given color display time, the pixel remains in that final condition for the remainder of the color display time.

Figure 8:
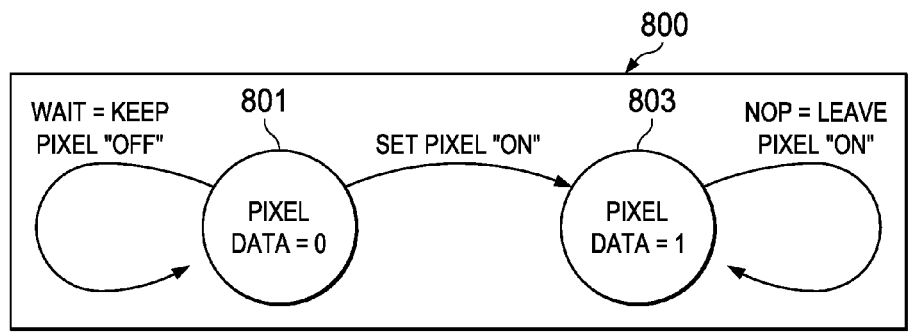
FIG. 8 illustrates in simplified state diagram the operation of a pixel element for use in an optical projection system incorporating additional aspects of the present application.

FIG. 8 illustrates in a simple state diagram 800 the operation of a pixel element in the DMD array. In FIG. 8, the pixel element, which includes a latch that can be updated at a "reset" with new information, is modeled as a two state machine.

As shown in FIG. 8, the pixel element begins at the beginning of a color display time with a "Pixel Data=0", which can correspond to either a "reflect" or "don't reflect" position, at state 801. As shown in FIG. 8, the state machine 800 will remain in the state 801 until a "Set pixel "ON" message is received. After the "Set pixel "ON"" message is received, the state machine 800 transitions to a state 803, "Pixel Data=1". As shown in FIG. 8, the state machine remain in state 803 for the rest of the display time. There is no event that will cause the state machine to leave state 803, after the entry point. In various arrangements that form aspects of the present application, recognition of the operation of the pixel elements as a two state machine are used to enable various high compression approaches for the data to be transmitted to the SLM.

Figure 9:
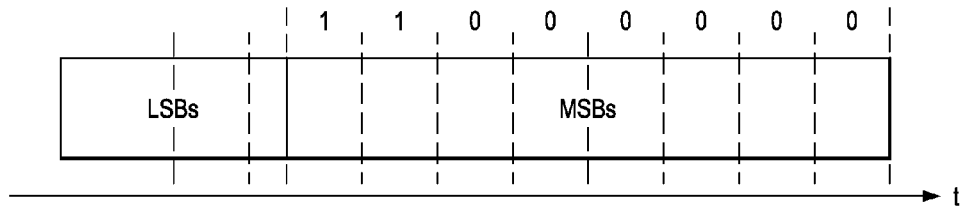
FIG. 9 illustrates in another timing diagram an example sequence used to transmit image data on an data interface illustrating various features of the present application.

FIG. 9 illustrates an example sequence for use with the arrangements and depicts a particular sequence for transmission of bit plane bits for a display time period. In this non-limiting example, the timeline has been partitioned into 2 defined sections: LSBs and MSBs. The MSB section conforms to the deterministic behavior outlined in FIG. 8, while the LSB section corresponds bits with no deterministic behavior. For this particular example, 3 LSB sections and 8 MSB sections are shown, although differing numbers can also be considered. In FIG. 9, a "dim majority" example of a sequence of bit plane data is depicted for a single pixel. In this example, the MSBs are shown initially at a "1" or "ON" level, followed by a series of "0's", indicating the final state of the pixel in this example sequence is "0". Because the count of the "1"s over the total count is in this example, less than 50%, the average pixel level or APL is less than 50%. In contrast, if the "1"s and "0"s in FIG. 9 were reversed, the example would have a count of "1"s greater than the count of "0"s, and the APL would be greater than 50%, a "bright majority" case. In a bright majority case, the final value of the pixel will be a "1", so that after the pixel transitions from a "0" state to a "1" state, it will remain in that final state.

Figure 10:
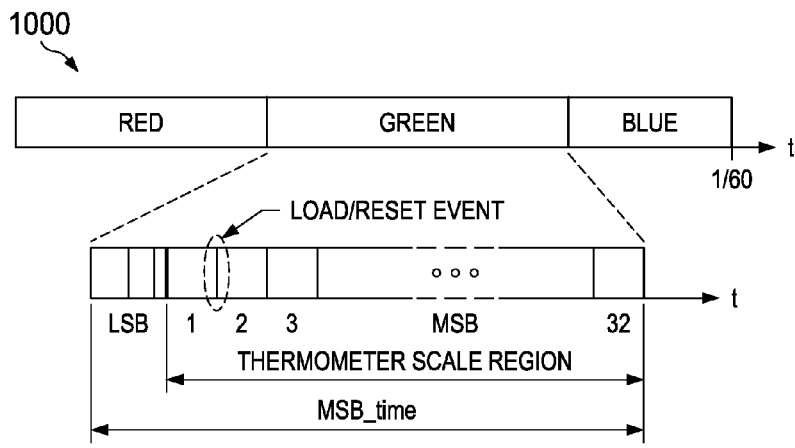
FIG. 10 illustrates in an another timing diagram an example data sequence used to illustrate additional features of the present application.

FIG. 10 depicts, in a simplified timing diagram 1000, an example arrangement to illustrate how the method arrangements can facilitate data compression in an image display system. In FIG. 10, a frame display time 't' is shown and is divided into red, green and blue color portions. This example shows a single instance of each of the colors R, G, B, but it is well known that using a higher number of instances per frame is desirable. In FIG. 10, the green display portion is shown in expanded detail. Using, for example, an 8 bit field for defining the bit planes of a color display time, in this arrangement, the "LSB" portion, which correlates to a fine intensity adjustment for a pixel in the green display time, are shown having non-uniform duration times which correspond to non-uniform intensity per time interval. The LSBs provide a fine adjustment for the pixel intensity and the times for these LSBs can be arranged to provide a fine intensity step between the intensity levels available from the "non-SLB" or MSB portions. In an example arrangement that forms an aspect of the present application, the LSBs are transmitted to the SLM device in the first portion of a color display time, that is, the time increases from left to right in FIG. 10. The LSBs can be provided with non-uniform time periods. The non-LSB portion of the field, or the MSBs, are used in this example arrangement with uniform time periods that are equally spaced for SLM load and reset operations. For example, the MSB region can be divided into 32 equal portions, in an illustrative arrangement using a 5 bit MSB field. A 5 bit field provides $2^5$ MSB portions or 32 MSB time portions. Using non-uniform time intervals for the MSBs can also be considered as an additional alternative. Further alternatives can be formed using a differing number of time intervals.

In the particular arrangement depicted in FIG. 10, a thermometer scale is used. In an illustrative example, the thermometer scale provides an intensity by having "1's" for a first portion of the MSBs, which will be transmitted to the SLM in sequence from left to right as shown in FIG. 10, followed by the "0's" in the thermometer scale. Once the pixel is set to a "0" in the thermometer scale, the following pixel values will also be a "0" until the next display frame time begins. Alternatively, in another example, the first portion of the thermometer scale can be "0"s, and the remainder can be "1"s, and once the pixel value transitions to "1", the pixel will remain at "1" for the rest of the load and reset cycles in the color display time.

The characteristic "thermometer scale" pattern formed by the arrangement for the bit plane information for the MSBs of the arrangement of FIG. 10 enables additional compression in the data to be transmitted to the SLM. For a given pattern, the thermometer scale indicates that for the MSB portion of the color display time, once the pixel element has reached a final state it will remain in that state. In certain arrangements of the present application, recognition is made that it is therefore not necessary to transmit additional information to that pixel location for the remainder of the display time, as the pixel has already reached the final state for that display time. Taking advantage of this recognition, certain of the novel arrangements of the present application use a "partial line" encoding. In the partial line encoding approach, the digital controller circuit encodes the bit plane data for the SLM in a manner that recognizes when the pixel element has reached a final state. The controller circuit then does not transmit additional bits to that pixel following the final state condition. That is, the encoding used in some of the arrangements transmits a partial line of encoded data to the SLM, which decodes the partial line to form a line for loading to the pixel array. In simulations the compression achieved has been measured for typical images and can be a substantial compression over the amount of data transmitted using prior known approaches, and the power consumed by the data interface can be correspondingly reduced for systems using the novel arrangements.

In an arrangement that forms another aspect of the present application, an average picture level (APL) can be calculated for each bit plane. In one arrangement, the APL can be determined for an entire frame display time, for example, by finding the APL for the red, green and blue display times, and dividing by three to obtain a combined APL. In another example arrangement, the average picture level can be determined for each color display time, for example, for a red display time. In one arrangement, the APL is compared to a threshold. If the number of "1"s is greater than 50% of the total, this is a "bright majority" case. In an approach for encoding this sequence, the transitions from "0" to "1" are transmitted, and after the pixel transitions to "1", no more bits are transmitted for that display time. In another arrangement, for a "dim majority" case, the average pixel level of the sequence is less than 50%, and the final value of the pixel in the sequence is "0". In this case, the transitions from "1" to "0" are transmitted and after the pixel reaches a final value of "0", no more bits are transmitted for that case. A dim majority case is shown in FIG. 9, for example, where the "1"s are transmitted in the first few load and reset times for the MSBs, and then the pixel transitions to "0" for the remaining load and reset cycles.

Figure 11:
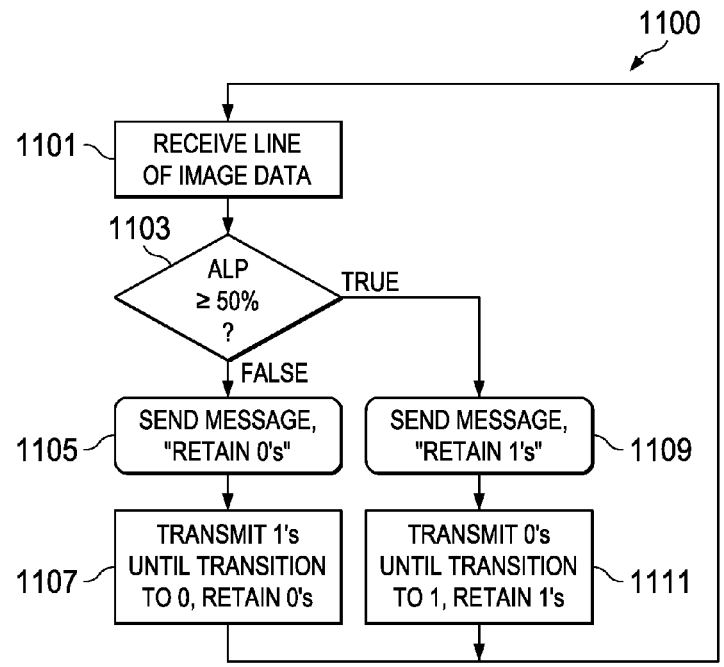
FIG. 11 depicts in a simplified flow diagram a novel method for encoding data used in an optical projection system incorporating features of the present application.

FIG. 11 depicts, in a flow diagram, a method arrangement that forms an additional aspect of the present application. In FIG. 11, a method for encoding partial line data in the controller device is shown. After the data is encoded, it will be transmitted to the SLM over a data interface as shown above. In FIG. 11, the method begins at step 1101, receiving a frame buffer containing bit plane image data. The average picture level or APL is determined at step 1103. If the APL for a particular segment or color display time is greater than or equal to 50%, the method transitions to step 1109. This branch indicates that the segment is a "bright majority" case, where the final state of the pixel will be a "1". A message is sent to the SLM receiver over the data interface indicating that for this segment or color display portion, the MSBs are in a bright majority case, and the decoder in the receiver should expect to retain the "1"s, and that once a pixel transitions to the "1" state, it will remain in that state and no additional data will be sent until the next display time. At step 1111, the encoded bits will be transmitted over the data interface to complete the method.

Returning to step 1103, if the average picture level or APL is <50%, the line or segmented portion is a "dim majority" case. In this example, the MSBs will initially transmit "1"s for the pixel, and then transition to "0". The final state of the pixel will be a "0". In this case, the digital controller transmits a "retain 0's" message to the SLM. The receiver in the SLM then knows that the encoded bits will include the "1"s until the pixel transitions to a "0" in a bit plane sequence, and once the pixel transitions to "0", it will remain in the "0" state for the rest of the display time and no additional bit plane data will be transmitted for that pixel.

In the method of FIG. 11, the steps performed by the encoding device are illustrated. At the receiver, an adaptive shift register or a block that implements an adaptive shift register function is provided. The receiver decodes the data using the message that indicates that a "retain "1's" or "retain "0's" encoding is used. After that, the decoder at the SLM knows to retain the transition pulse and use that final value for that pixel for the rest of the display time period. By decoding the command message, the decoder comprehends that no new data will be received from the transmitter for that pixel after the final pixel state is reached.

FIG. 12 illustrates in a block diagram 1200 the functions performed by a receiver 1201 coupled to the interface I/F used by the encoding circuit performing the arrangement of FIG. 11. The receiver 1201 is operable to decode the data transmitted by the encoder performing the methods of FIG. 11. In FIG. 12, receiver 1201 is coupled to the data interface labeled I/F and receives, for each time interval such as a MSB time interval, a command parameter, and partial line data. The data receiver transmits the pixel data, and the pixel mode, to a decoder function 1203. The decoder forms complete lines from the partial line data using the parameters such as a frame buffer number, a line number, and the pixel mode, such as "retain "0's"" or "retain "1's". A plurality of frame buffers 1205 is provided, in this arrangement there are 3 1 bit frame buffers for each pixel in the array, for example, a red, green and blue frame buffer can be provided. Additional frame buffers can be provided, or alternatively, only a 1 bit frame buffer, the storage elements associated with the pixel elements, can be provided. These various alternative arrangements form additional aspects of the present application and these alternatives are contemplated by the inventors and fall within the scope of the appended claims.

FIG. 13 illustrates, in another timing chart 1300, a series of MSB pixel values for a 5 pixel per line example. A line in a typical DMD or LCoS device can have hundreds or thousands of pixels in a single line. A line can represent either a row, or a column, in the array and the choice of whether a line of data corresponds to a row or a line is left to the system designer and the arrangements of the present application are not limited by any particular image device arrangement.

In FIG. 13, the MSB time interval #1 contains 5 bits, one for each pixel, corresponding to a first MSB time period. In FIG. 13, the 5 pixel elements transition towards a "0" final state, as indicated in the MSB time intervals "#1-#7", and in the 35 possible bits that are shown in the row labeled "ASIC Pixel States", there are 10 "1"s. The APL for this example is therefore <50%, and this is a "dim majority" case. The row labeled "APL Pixel States" indicates the case where all of the bits that are to be used in the MSB time intervals are shown prior to encoding. The novel arrangements can encode these bits so that substantially less than all of these bits are transmitted.

In FIG. 13, the row labeled "Transmit Bits" indicates how the encoding scheme in this example arrangement affects the bits that are actually transmitted over the data interface. At MSB time interval #1, the first condition, the initial condition, has a pattern "10111", so that in the initial MSB time interval, four pixels are in the "1" state, and one pixel is in the "0" state. In this example, the final pixel state is a "0" for each pixel, so that in the method of FIG. 11, the controlling circuit will transmit "1"s until the transition to a "0" occurs for any pixel, and then the receiver is to retain that state for that pixel. In FIG. 13, the row labeled "1 bit DMD Frame Buffer" illustrates the decoded pixel bits in the SLM. As the encoded bits are decoded by the receiver circuits in the SLM, the value in the 1-bit DMD Frame Buffer should match, for each MSB time interval, the pattern in the row labeled "ASIC Pixel States" at MSB time interval #1. This is indicated by the "=" sign and the arrow at the left side of FIG. 13.

For example in FIG. 13, in the MSB time interval #2, the ASIC pixel state is "00111", however, the row labeled "Transmit Bits" shows the transmitter will "skip prev. 0's" and the row labeled "#Transmit Bits" illustrates that the number of bits is "4". Thus because one of the pixels is already at a final state of "0" from the prior message, only 4 bits are transmitted for the second MSB time interval.

Further, as shown in FIG. 13, the value for one of the pixels in MSB time interval #2 changes from a "1" in MSB time interval #1, to a "0" in MSB time interval #2. The effect of this in the encoding method of the present arrangement appears in the "Transmit Bits" row of FIG. 13 at the MSB time interval #3, where the controller device only transmits 3 bits, because two of the pixels have already transitioned to the final state, of "0". Continuing to skip over the previous "0"s, the number of bits transmitted on the data interface in each of the MSB time intervals continues to go down until at the last two MSB time intervals, no bits are transmitted as shown by the row "Transmit Bits" at MSB time intervals #6 and #7, because all of the 5 pixels in this simple example have already reached the final value or "0". Thus once the pixels have reached a final state, the data interface including the transmitter circuitry and the receiver circuitry can be placed in a sleep or low power mode, and no data has to be transmitted for the remaining portion of the display time for those pixels. This state, where no data is transmitted for the last MSB time periods, can save substantial power consumption compared to prior known methods.

In the example of FIG. 13, the total number of bits transmitted is indicated by the sum symbol Σ as shown in the row "#Transmit Bits" in FIG. 13 is 15. Accordingly, the compression rate obtained in this non-limiting example was 15/35, when compared to a prior known non-compressed data approach for transmitting the same data.

Figure 14:
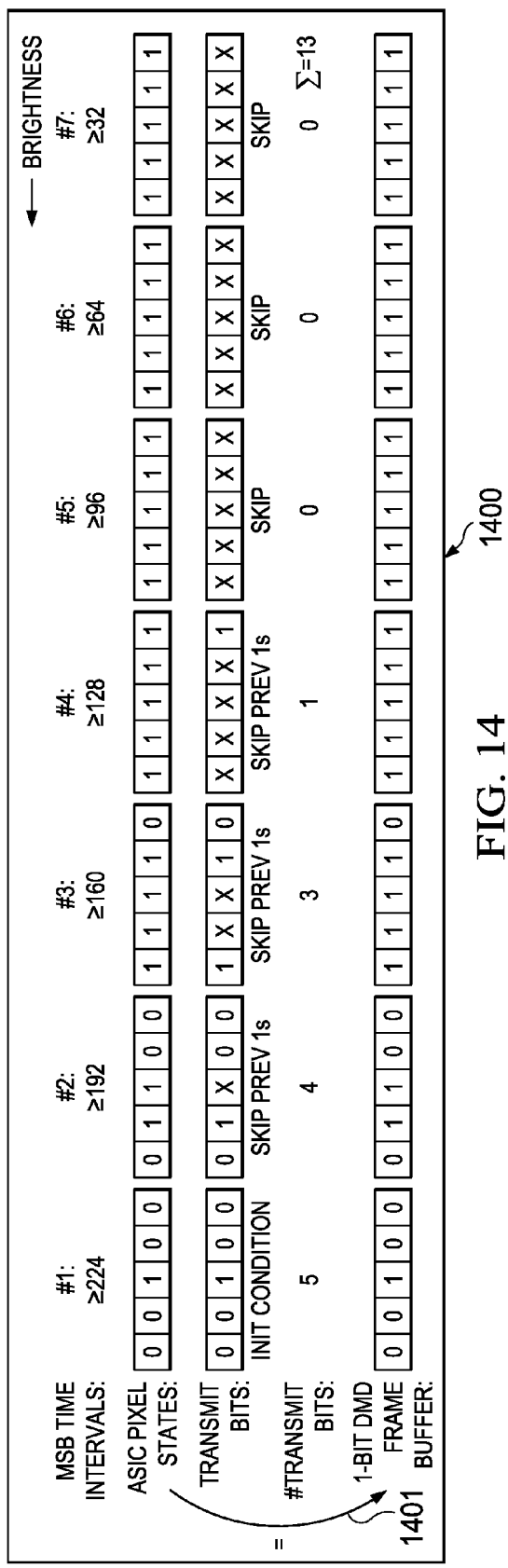
FIG. 14 depicts in a further timing diagram another sequence illustrating the transmission of encoded data in an optical projection system incorporating additional features of the present application.

FIG. 14 illustrates in a timing diagram 1400 the above described method for encoding using the APL levels for a "bright majority" example. Again, a simple case with 5 pixels in a line is shown. In the row labeled "ASIC Pixel States", the unencoded bits for the particular bit planes are shown. As can be seen, the pixel states begin largely at "0" at MSB time interval #1, and end with all pixels at "1", as shown in MSB time interval #7. The total number of "1"s for this example of the MSB portion of the bit plane being transmitted is 28/35 total bits, so this is a "bright majority" example, that is, the APL is >50%.

The encoding method thus begins by transmitting to the receiver over the data interface a message that indicates the receiver is to "retain "1"s"; so that once a pixel transitions to the final state of "1", the transmitter will not send additional bits for that pixel. At the time interval labeled MSB #1, the initial condition for the 5 pixels is shown as "00100". All 5 of this bits will be transmitted by the controller circuit on the data interface to set up the initial state for each pixel. This is indicated at the row labeled "1-bit DMD Frame Buffer", which has the same pattern as that in the ASIC Pixel States for the MSB time interval #1.

As can be seen in FIG. 14, at the MSB time interval #2, the receiver has an adaptive shift register (or a functional block that implements the adaptive shift register) that retains the "1" from the MSB time interval #1, and so only 4 bits are transmitted during the MSB time interval #2. This encoding scheme continues, so that once all five pixels in this example have transitioned to a final "1" state, the transmitter no longer sends any more bits on the data interface, as shown in the row labeled "Transmit Bits" for the MSB time intervals labeled #5, #6 and #7 in FIG. 13. In this example, after the pixels have all reached a "1" state, in MSB time interval #4, the data interface can be powered down for the remainder of the display time period, saving substantial power.

The number of bits transmitted for this example is shown by the Σ symbol in FIG. 14, and the sum of the bits transmitted from the encoding circuitry is 13 in this case. So the compression achieved by use of the method of FIG. 12 is 13/35, when compared to transmitting the bits without encoding. The row labeled "1-bit DMD Frame Buffer" indicates that after the decoding operation of the methods, the data for the DMD for each MSB time interval matches the patterns for the unencoded data as shown in the row labeled "ASIC Pixel States" in FIG. 14. The arrow 1401 indicates the two buffers are equal for each of the MSB time intervals.

Figure 15:
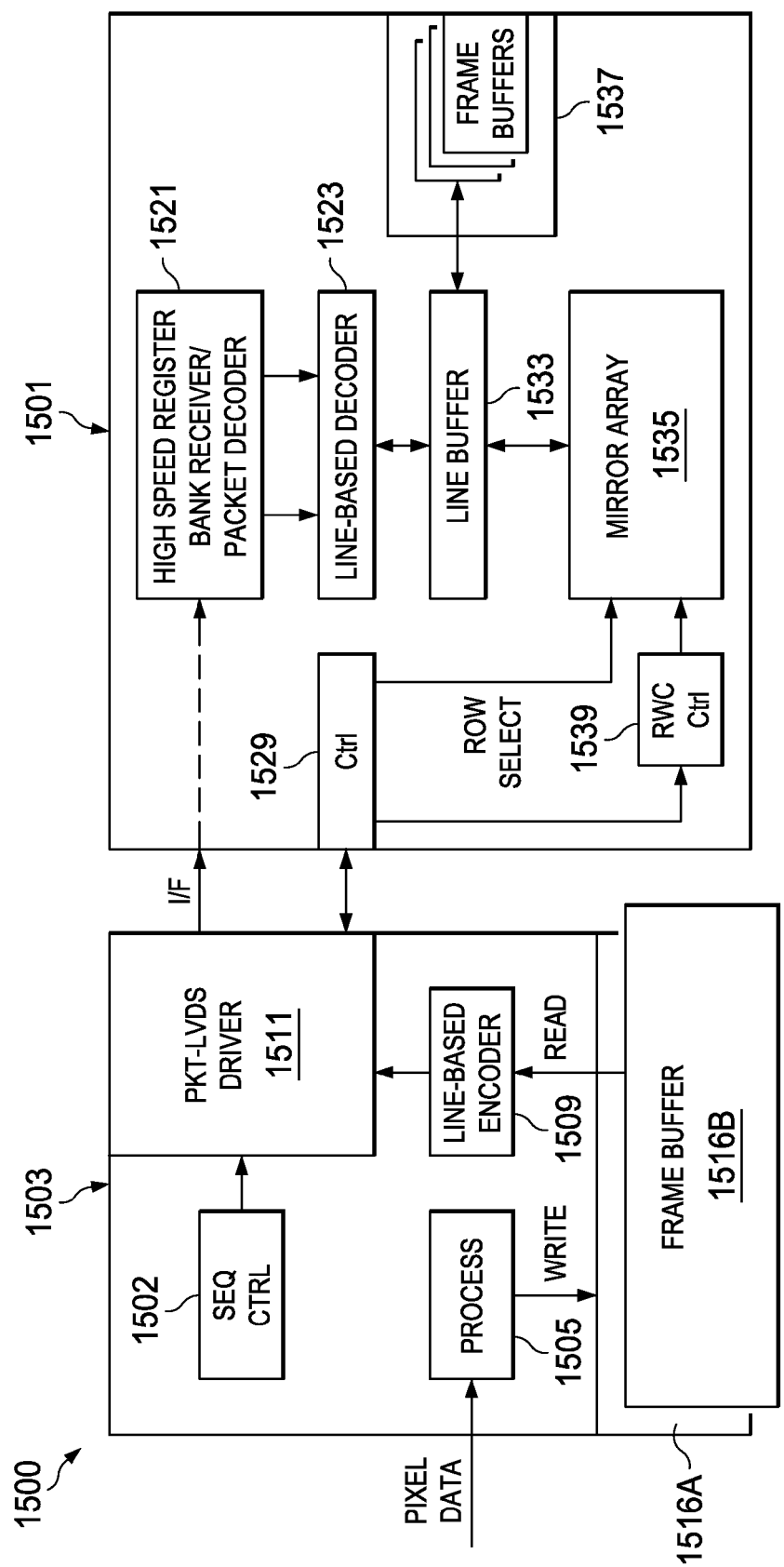
FIG. 15 depicts in another simplified block diagram an arrangement for forming an optical projector including a digital controller and a spatial light modulator incorporating additional features of the present application.

FIG. 15 depicts in a simple block diagram 1500 a digital controller 1503 and a SLM circuit 1501 that incorporate various aspects of the present application. In an example arrangement, the digital controller 1503 can be implemented by a single integrated circuit such as an ASIC device; however the arrangements of the present application are not limited to this example implementation and in alternative arrangements, the digital controller 1503 can be a module, circuit board, or system and the functional blocks can be formed from individual components or can be formed from smaller ASIC, FPGA or CPLD devices, for example. Microprocessor, digital signal processors or microcontrollers can be used with stored program instructions to some or all of the functions of the blocks in either the digital controller 1503 or the SLM circuit 1501, and multichip packages, stacked packages, and other multi-chip modules can be used to form additional alternative arrangements for the controller circuit 1503 and the SLM device 1501, these additional arrangements form alternatives that are also contemplated as aspects of the present application.

In FIG. 15, the controller circuit 1503 includes functional blocks that can perform the encoding and data compression arrangements described above. An interface driver circuit 1511, which can be an for example LVDS bus driver such as a circuit driving one or more twisted pairs using differential signaling, is coupled to the data interface labeled I/F. In alternative arrangements, other data interfaces can be used. Packet signaling can be used with the LVDS driver 1511 as indicated by the label "PKT-LVDS".

Further, in FIG. 15 the controller circuit includes a sequencer controller 1502, which controls the data transmission timing and other functions to ensure the sequential operations are correctly performed. A process function 1505 is coupled to the incoming data labeled Pixel Data, and the process control 1505 writes bit plane data to one of the two frame buffers 1516A and 1516B (more frame buffers can also be used in forming alternative arrangements). The frame buffers 1516A and 1516B are arranged so that the process function 1505 can write incoming data into one frame buffer while the line based encoder 1509 reads data for transmission to the SLM. These frame buffers 1516A and 1516B can be exchanged so that the system 1500 can keep up with the incoming frames of pixel data even while processing the previously received image data using encoding and compression as described herein.

The line based encoder 1509 can retrieve a line of image data from the frame buffers and can perform one of the encoding arrangements described above. In an example illustrative arrangement, the line based encoder 1509 can determine whether the current line retrieved from the frame buffer matches the prior line, in that case a message can be transmitted to the receiver to repeat the prior line. In a further arrangement, the line based encoder can perform the "all 1's", "all "0's" and "same as prior segment" data compression as described above. In a further arrangement, the line based encoder 1509 can perform the method as shown in FIG. 11, and can determine the average picture level (APL) as described above. In any of these arrangements, the driver block 1511 receives the encoded data and can drive the data interface I/F with the encoded data to the SLM 1501.

In FIG. 15, SLM circuit 1501 includes a receiver 1521 that is coupled to receive the encoded data on the interface I/F. The line data is then transmitted to the decoder 1523 which forms the line data for the bit plane to be displayed and stores the bits in the line buffer 1533. In FIG. 15, the line buffer 1533 is coupled to a plurality of frame buffers 1537. Depending on the number of storage cells available, these frame buffers can form a 1-bit or larger frame buffer for each pixels. For example a red, green and blue frame buffer can be formed. The line buffer 1533 is coupled to the mirror array and provides the pixel data to the storage cells in the Mirror Array 1535. A read write controller 1539 is coupled to the Mirror Away 1535 and in certain arrangements, the memory storage cells within the Mirror Array 1535 can be used as a 1-bit frame memory. By using the 1-bit frame memory for the Mirror Array 1535, the SLM device 1501 can use a "read write modify" approach to implement the decoding scheme described above where the controller 1503 transmits encoded data using the APL methods.

A feature of the arrangements disclosed herein where the spatial light modulator device includes additional frame buffers is that the timing of the data transmitted on the data interface between the controller circuit and the spatial light modulator can be made independent of the load and reset timing needed to display the bit planes on the spatial light modulator. That is, by using a data preload arrangement, data needed for loading the lines of the pixel array can be transmitted over the data interface I/F and stored in the frame buffers on the SLM ahead of the need for the data, so that the timing of the data transmitted from the encoders on the control devices described above can be different from, and independent of the load and reset sequences and the corresponding time intervals needed to operate the SLM device to display the bit planes to the viewer. In this manner, the length of the displayed bits can be decoupled from time it takes to load the following bit, thereby allowing for increased image quality. Additionally, pre-loading bit planes could also result in increased power consumption by allowing for more optimum sleep mode cycling whereby the contiguous sleep times are maximized. In one example, color bits for bit planes can be transmitted in a time interleaved fashion on the data interface to pre-load the color frame buffers for additional flexibility in the data compression schemes. However, in alternative arrangements, the compression schemes described above can be used to reduce power in a system without the use of the additional frame buffers on the SLM, by using the data compression and encode/decode techniques as described above. These various arrangements form additional aspects of the present application that are contemplated by the inventors and which fall within the scope of the appended claims.

Additional arrangements that form additional aspects of the present application further address the compression of data transmitted over the high speed interface between a digital controller device and the spatial light modulator. In some arrangements, the storage cells associated with the pixels of the spatial light modulator such as a DMD are given read capability to enable the storage cells associated with the pixels to act as a frame buffer or memory.

In various aspects of the present application, novel arrangements are provided for reducing power consumption and the bandwidth required in a system for optical projection. In certain aspects of the present application, the data interface between the spatial light modulator and the data image processing components of an optical projection system are arranged to perform data compression. The data compression greatly reduces the amount of data that is transmitted on the data interface between the spatial light modulator and the digital image processing component. Because switching of driver devices that are used to drive the data interface is reduced in direct correspondence with the data compression, the power consumed by the data interface is also greatly reduced. The power savings can result in longer battery life in portable, battery powered devices. Alternatively, the power savings can be used to add brightness to the system by directing additional power to the illumination sources used for projection. In this application, brighter illumination can be achieved by use of the novel arrangements of the present application, without a corresponding increase in power consumption. Battery life of portable devices such as portable projectors can be increased; further, the use of embedded optical projectors in rechargeable portable devices such as laptop computers, tablets, "phablets" and smart phones is enhanced by reduced power consumption in the projector.

In one aspect of the present application, a new methodology is provided where in a pulse width modulated (PWM) display system, the time used to display bit planes during a frame display period is split into two major sections: a spaced time interval section used to represent coarse brightness intensities referred to as "NonLSB" sections or MSB sections, and a non-uniformly spaced time interval section used to represent fine grain brightness intensity, referred to as "LSB" sections. In one illustrative arrangement, the NonLSB section uses a thermometer scale intensity scheme. In this approach, recognition is made that the spatial light modulator pixel elements are binary devices within one color display time period, that is, once the transition of the pixel is made from a first state (e.g., OFF) to a second state (e.g., ON), the pixel will remain in the final state until the next display frame period begins. Accordingly, in the novel approaches that form aspects of the present application, the data to cause that pixel to transition to the final state can be transmitted once across its associated time intervals. For example, in time to display a particular color, there may be eight uniform time intervals. If a pixel has already transitioned to a final state during the display time, in an example data compression arrangement that forms an aspect of the present application, the information for that pixel is not transmitted for the remaining uniform time intervals.

The thermometer scale encoding scheme creates a large correlation between time adjacent intervals in the pixel data used in the PWM communications to the spatial light modulator for display. The large correlation between the adjacent time intervals can be further exploited to significantly reduce the amount of data transmitted from a controller circuit to the spatial light modulator on a high speed data interface. Further, by using the two sections of the PWM timeline in this arrangement, the size of a frame buffer that resides internal to the spatial light modulator can be reduced. Using the arrangements of the present application, the internal frame buffer can range in size from 1 bit to 9 bits per pixel. This is a significant reduction in the internal frame buffer needed, in contrast to the 24 bit frame buffer per pixel that is used for 8 bit 3 color per pixel systems in the image frame buffer. In other systems, more bits for pixel per color are used, for example, 10 bits per color per pixel. Using the arrangements of the present application, the bit planes can efficiently reproduce the entire range of color intensities from these frame buffers while using only a 1 bit, or using a 1-3 bit buffer in the spatial light modulator.

In another alternative arrangement that forms an additional aspect of the present application, additional recognition is made that the storage cell associated with each pixel in the spatial light modulator can be utilized as a frame buffer. In sharp contrast to the "write only" approaches in the known prior approaches to SLMs such as DMDs, in the novel arrangements of the present application the storage cells are also configured for read operations. The SLM device can then update the data in the pixel array using a "read modify write" approach. A simple decoding approach can then be performed within the SLM. As described above, for the coarse pixel intensities that correspond to the Non-LSBs, each pixel can change from a first state, e.g. a 0 or "off" state, to a second state, e.g. a or 1 or "on" state, at most once in a color display time period. The value for the pixel for the subsequent bit plane intervals will be the same value, so that rather than repeatedly sending the same value again and again during the color display time period, the transition value can be sent once per NonLSB section. Allowing for a "read" capability for the storage cells associated with the pixel elements, using them as a frame buffer memory, can eliminate the need for an additional 1 bit frame buffer that is located internal to the SLM.

In yet another arrangement that forms an additional aspect of the present application, additional memory cells for use as image data buffers are formed internal to the spatial light modulator that includes the array of pixel devices. Providing these additional storage areas enables the timing of the data on the data interface to be independent of the load and reset timing cycle for the spatial light modulator array, allowing for pre-loading of the data, and further enabling data compression and power reduction techniques at the data interface.

In another arrangement, a multiple color, multiple bit frame buffer can be located internal to the SLM that allows for further power savings. Using these frame buffers to pre-load image data and to store the image data onboard the SLM, the power consumed at the high speed data interface between the DMD controlled circuit and the SLM can actually drop to zero or near zero.

In a further illustrative arrangement, a simple encoding and decoding scheme arranged to reduce the data transmitted over the high speed interface which does not require additional storage elements internal to the SLM is provided. In this illustrative arrangement, the line to be displayed is first tested to see if it repeats the prior line for that location in the array from the prior time interval, and if so, no data is transmitted to the SLM. If the new line does not repeat the prior line, the line is partitioned into line segments, and each line segment is evaluated for additional compression opportunities.

In this arrangement, if the line segment contains only "all 1's", or if the segment contains only "all-0's", a message is sent to the receiver in the SLM instead of the actual data, so that there is no need to send all of the "1's" or all of the "0's". If the line segment equals a prior line segment, a simple message to repeat the prior line segment is sent to the receiver in the SLM. Finally, if the line segment contains data that does not meet any of these tests, the uncompressed data is transmitted in a conventional manner over the high speed interface. By reducing the amount of repeated data that is transmitted over the high speed interface, power consumed by the devices driving data on the high speed interface can be greatly reduced. Further the encoding and decoding used requires little signal processing so that these techniques can be implemented easily in existing DMD circuit devices and in existing SLM devices, without the need for additional storage internal to the SLMs.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A method for data compression in a digital image projection system, comprising:
    receiving signals containing image data at a digital controller, which is coupled to a spatial light modulator by a data interface, wherein the spatial light modulator comprises a two dimensional array of pixels;
    processing the image data to form frame images, and storing the frame images in a frame buffer coupled to the digital controller;
    using frame images retrieved from the frame buffer, forming bit plane images corresponding to a sequence of bit planes to be displayed by the spatial light modulator during an image display time;
    selecting a line of bits from a selected one of the bit plane images for transmission to the spatial light modulator over the data interface;
    comparing the selected line of bits to a previously transmitted line of bits, and if there is a match, moving to another line of bits for transmission to the spatial light modulator;
    if there is no match in the comparing, partitioning the selected line of bits into a plurality of line segments for transmission over the data interface to the spatial light modulator;
    determining per line segment, for at least first and second ones of the line segments, whether data compression is possible;
    responsive to the determining indicating data compression is possible, transmitting an encoded message to the spatial light modulator indicating a compressed data type is to be used for a selected line segment; and
    responsive to the determining indicating no data compression is possible, transmitting unencoded bits corresponding to the selected line segment to the spatial light modulator.

2. The method of claim 1, wherein partitioning the selected line of bits into a plurality of line segments for transmission over the data interface further comprises dynamically partitioning the line of bits into line segments based on the data being transmitted.

3. The method of claim 1, wherein transmitting an encoded message to the spatial light modulator indicating a compressed data type is to be used for a selected line segment further comprises:
    determining whether the bits in the selected line segment contains all 1's, and if the determining is true, transmitting an encoded message indicating all 1's to the spatial light modulator.

4. The method of claim 1, wherein transmitting an encoded message to the spatial light modulator indicating a compressed data type is to be used for a selected line segment further comprises:
    determining whether the bits in the selected line segment contains all 0's, and if the determining is true, transmitting an encoded message indicating all 0's to the spatial light modulator.

5. The method of claim 1, wherein transmitting an encoded message to the spatial light modulator indicating a compressed data type is to be used for a selected line segment further comprises:
    determining whether the selected line segment contains the same data as the last transmitted line segment, and if the determining is true, transmitting an encoded message indicating a repeated line segment to the spatial light modulator.

6. The method of claim 1, wherein the data interface further comprises a low voltage differential signaling (LVDS) interface.

7. The method of claim 1, and further comprising:
    receiving encoded data on the data interface in the spatial light modulator, the encoded data corresponding to a line segment for a line of a bit plane to be displayed;
    decoding the encoded data to form bits for a line segment; and
    storing the bits corresponding to the line segment in a line buffer.

8. The method of claim 7, wherein decoding the encoded data further comprises:
    receiving a message indicating a current line number; and forming a line in the line buffer corresponding to the current line, responsive to the determining.

9. The method of claim 8, wherein decoding the encoded data further comprises:
    determining from the encoded data that the bits of a current line segment are all 1's; and
    responsive to the determining, storing all 1's in the line buffer for the current line segment.

10. The method of claim 9, wherein decoding the encoded data further comprises:
    determining from the encoded data that the bits in a current line segment are all 0's; and
    responsive to the determining, storing all 0's in the line buffer for the current line segment.

11. The method of claim 7, wherein decoding the encoded data further comprises:
    determining from the encoded data that a current line segment is a repeat of a prior received line segment; and
    responsive to the determining, storing the bits from the prior received line segment in the line buffer for the current line segment.

12. The method of claim 1, wherein providing the spatial light modulator further comprises providing the two dimensional array of pixels as a digital micromirror device.

13. The method of claim 1, wherein the two dimensional array of pixels is within a liquid crystal on silicon device.

14. A method for data compression in an image display system using a spatial light modulator, comprising:
    receiving signals containing image data at a digital controller, which is coupled to a spatial light modulator by a data interface, wherein the spatial light modulator comprises a two dimensional array of pixels;
    processing the received signals to form frame images, and storing the frame images in a frame buffer coupled to the digital controller;
    using stored frame images retrieved from the frame buffer, forming a plurality of bit plane images corresponding to a sequence of bit planes to be displayed by the spatial light modulator during an image display time, the sequence of bit planes including an LSB portion and a non-LSB portion per pixel, for a plurality of the pixels in the spatial light modulator, the non-LSB portion being formed as a sequence of bits corresponding to uniform time intervals that are portions of the image display time, the non-LSB portion using a thermometer code arranged such that for a particular bit position in a non-LSB portion, the sequence for the uniform time intervals corresponds to an intensity for a particular pixel in the spatial light modulator;
    using a data compression scheme, forming encoded data corresponding to the non-LSB portions of the bit planes;
    per line, for a plurality of lines of the bit planes, transmitting encoded data forming partial lines over the data interface to the spatial light modulator, and transmitting control signals indicating the encoding scheme used to form the partial lines to the spatial light modulator;
    to the spatial light modulator, transmitting a message indicating a compressed data type is to be used for a first partial line, responsive to data compression being possible for the first partial line; and
    to the spatial light modulator, transmitting unencoded bits corresponding to a second partial line, responsive to no data compression being possible for the second partial line.

15. The method of claim 14, wherein forming encoded data corresponding to the non-LSB portions of the bit planes further comprises:
    for a selected bit plane, forming an average picture level by summing a number of "on" pixels and dividing by a total number of pixels;
    comparing the average picture level to a threshold;
    if the average picture level is greater than a threshold, transmitting a first encoded message to the spatial light modulator on the data interface indicating a first encoding type; and
    subsequently, sending a partial line of encoded data on the data interface, the partial line per uniform time interval including bits in a second state and bits transitioning to a first state from the second state for the non-LSB bits; and
    in response to any bit corresponding to a pixel in a selected line having transitioned to the first state during a sequence of non-LSB bits, skipping that bit when transmitting subsequent encoded bits in the sequence of non-LSB bits.

16. The method of claim 15, wherein forming encoded data corresponding to the non-LSB portions of the bit planes further comprises:
    if the average picture level is less than the threshold, transmitting a second encoded message to the spatial light modulator on the data interface indicating a second encoding type; and
    subsequently, sending a partial line of encoded data on the data interface, the partial line per uniform time interval including bits in a first state and bits transitioning to a second state from the first state for the non-LSB bits; and
    in response to any bit corresponding to a pixel in a selected line having transitioned to the second state during a sequence of non-LSB bits, skipping that bit when transmitting subsequent encoded bits in the sequence of non-LSB bits.

17. The method of claim 16, and further comprising:
    receiving encoded data as partial lines of data from the data interface at a receiver in the spatial light modulator;
    decoding the received encoding data to form bits in a line buffer; and
    in response to a completed line being formed in the line buffer, loading the line to a frame buffer corresponding to a current line in an array of pixels in the spatial light modulator.

18. The method of claim 17, wherein receiving the encoded data further comprises:
    receiving a command message indicating an encoding type;
    receiving, for a first uniform time period, bits corresponding to pixel values for a line, the bits indicating an initial value for pixels in the spatial light modulator in an image display time period;
    subsequently, receiving bits for additional time intervals that correspond to pixel transitions from a first state to a second state during the image display time period;
    skipping bits that have reached the second state in a previous encoded message; and
    forming a line of pixel data for display using the received bits and the skipped bits per uniform time period.

19. The method of claim 18, wherein the encoding type indicates the receiver is to retain "1" values and that a final pixel state during a frame display time is a "1".

20. The method of claim 18, wherein the encoding type indicates the receiver is to retain "0" values and that a final pixel state during a frame display time is a "0".

21. A system for displaying images using data compression, comprising:
- a digital controller circuit coupled to a data interface, the digital controller circuit configured to receive image data for display form bit planes comprising lines of data to transmit to a spatial light modulator over the data interface; and encode data for transmission to the spatial light modulator using a data compression scheme; and
- a spatial light modulator circuit coupled to the data interface, the spatial light modulator circuit configured to: receive the encoded data from the digital controller circuit; and decode the encoded data to produce unencoded data corresponding to pixel data for display on an array of pixel elements in the spatial light modulator;
- wherein data transmitted from the digital controller circuit to the spatial light modulator further comprises: encoded data that is formed from the bit planes using a data compression scheme to form partial lines of data; a message indicating a compressed data type is to be used for a first partial line, responsive to data compression being possible for the first partial line; and unencoded bits corresponding to a second partial line, responsive to no data compression being possible for the second partial line.

22. The system of claim 21, wherein the digital controller circuit further comprises:
- an encoder coupled to a frame buffer, the encoder configured to: receive data from the frame buffer; and form bit planes of pixel data corresponding to a pixel intensity for an image display time;
- wherein the encoder is further configured to: select a line of data from the bit plane; compare the line of data to a previous line of data transmitted to the spatial light modulator; and skip the selected line if the data is repeated, responsive to the comparing; and
- wherein the encoder is further configured to: partition the line of data from the bit plane into line segments; determine, per line segment, whether data compression is possible for the line segment; and transmit encoded data to the spatial light modulator corresponding to the line segment, responsive to the determining.

23. The system of claim 21, wherein the spatial light modulator further comprises: a receiver coupled to the data interface; and a decoder for receiving encoded data, the decoder configured to receive encoded data from the digital controller and to store unencoded bits in a line buffer corresponding to the encoded data.

24. The system of claim 23, wherein the spatial light modulator further comprises an array of pixel elements for displaying data, each pixel element having an associated storage buffer, and the decoder is further configured to load the unencoded data from the line buffer into a line of the storage buffers.

25. The system of claim 21, wherein the digital controller further comprises:
- an encoder coupled to a frame buffer, the encoder configured to: receive data from the frame buffer; and form bit planes comprising LSB and non-LSB portions, the LSB portions providing a fine intensity, the non-LSB portions providing a coarse intensity, and the non-LSB portions further comprising a sequence of pixel values in a thermometer code corresponding to a pixel intensity for an image display time;
- wherein the encoder is further configured to: determine an average picture level for the bit plane; compare the average picture level to a threshold; and encode the non-LSB portions into partial line data using an encoding type selected responsive to the compare.

26. The system of claim 21 wherein the spatial light modulator further comprises a receiver coupled to the data interface and a decoder coupled to the receiver, the receiver configured to receive encoded data from the data interface, and the decoder configured to: decode the encoded data and to form unencoded data in a line buffer; receive non-LSB bits corresponding to a sequence of bit planes for display in a pixel array; receive an encoding type message; and decode received non-LSB bits corresponding to the encoding type message.

27. The system of claim 21, wherein
the spatial light modulator circuit includes a plurality of frame buffers for storing pixel data for display.

* * * * *